US012800716B2

(12) United States Patent
Almoneef et al.

(10) Patent No.: US 12,800,716 B2
(45) Date of Patent: Nov. 17, 2026

(54) ANOMALOUS PHASE DETECTION BASED GROUND PENETRATING RADARS

(71) Applicant: Prince Sattam Bin Abdulaziz University (PSAU), Al Kharj (SA)

(72) Inventors: Thamer Almoneef, Al Kharj (SA); Rayed Alyousef, Al Kharj (SA); Muhammad Amin, Madinah (SA); Omar F. Siddiqui, Madinah (SA)

(73) Assignee: PRINCE SATTAM BIN ABDULAZIZ UNIVERSITY (PSAU), Al Kharj (SA)

( * ) Notice: Subject to any disclaimer, the term of this patent is extended or adjusted under 35 U.S.C. 154(b) by 217 days.

(21) Appl. No.: 18/763,884

(22) Filed: Jul. 3, 2024

(65) Prior Publication Data

US 2026/0009884 A1 Jan. 8, 2026

(51) Int. Cl.

| | |
|---|---|
| ***G01S 7/41*** | (2006.01) |
| ***G01S 7/03*** | (2006.01) |
| ***G01S 13/88*** | (2006.01) |
| *G01S 7/35* | (2006.01) |

(52) U.S. Cl.

CPC ............... *G01S 7/411* (2013.01); *G01S 7/032* (2013.01); *G01S 13/885* (2013.01); *G01S 7/354* (2013.01); *G01S 7/414* (2013.01)

(58) Field of Classification Search

CPC .......... G01S 7/411; G01S 7/032; G01S 7/354; G01S 7/414; G01S 13/885; G01S 13/36; G01S 13/34

USPC .................................................... 342/195, 27

See application file for complete search history.

(56) References Cited

U.S. PATENT DOCUMENTS

| | | | | |
|---|---|---|---|---|
| 6,445,334 | B1 * | 9/2002 | Bradley | G01S 13/90 342/195 |
| 9,207,316 | B2 * | 12/2015 | Stolarczyk | H01Q 1/3216 |
| 9,581,690 | B2 * | 2/2017 | Knierim | G01S 13/003 |
| 9,915,727 | B1 * | 3/2018 | Reznack | G01S 13/885 |
| 10,393,906 | B2 * | 8/2019 | Tsunasaki | G01V 3/12 |
| 12,474,444 | B2 * | 11/2025 | Kavousi Ghafi | G01S 13/584 |
| 2013/0113648 | A1 * | 5/2013 | Duvoisin, III | H01Q 9/27 342/22 |
| 2014/0002292 | A1 * | 1/2014 | Knierim | G01S 13/0209 342/22 |
| 2014/0240196 | A1 * | 8/2014 | Eide | H01Q 1/38 343/893 |
| 2023/0184925 | A1 * | 6/2023 | Fonts | G01S 13/885 342/127 |
| 2025/0347733 | A1 * | 11/2025 | Abushab | G01R 31/281 |
| 2026/0036674 | A1 * | 2/2026 | Kavousi Ghafi | G01S 7/40 |

FOREIGN PATENT DOCUMENTS

| | | | | |
|---|---|---|---|---|
| CN | 212647018 U | * | 3/2021 | |
| GB | 2479872 A | * | 11/2011 | G01V 3/12 |

* cited by examiner

*Primary Examiner* — Chuong P Nguyen

(74) *Attorney, Agent, or Firm* — MUGHAL GAUDRY & FRANKLIN PC

(57) ABSTRACT

A method of buried metal object detection is described, which includes generating RF signal in a radio frequency module, supplying RF signal to a ground penetrating radar, scanning the ground penetrating radar over an area comprising buried metal objects, and detecting a buried metal object using anomalous phase response measured in the reflected signals.

20 Claims, 30 Drawing Sheets

1260

1290

ANOMALOUS PHASE DETECTION BASED GROUND PENETRATING RADARS

TECHNICAL FIELD

At least one example generally relates to ground penetrating radars (GPRs), and more particularly to one or more circuitries configured to run anomalous phase detection method to do radar signals processing in ground penetrating radars to not only detect a metal object but also characterize it, more specifically in subsurface environments.

BACKGROUND

GPR technology has enabled subsurface exploration by utilizing electromagnetic waves to unveil structural features of materials hidden beneath a surface and also characterize them. GPR systems, using time domain or frequency domain analyses, have become key enablers of exploration in diverse fields such as archaeology, civil engineering, and environmental studies, to name a few examples. Frequency domain GPR methods analyze the frequency of reflected signals to characterize subsurface objects. Frequency modulated continuous wave (FMCW) and stepped frequency continuous wave (SFCW) methods have improved the resolution and interpretability of radar signals. However, these methods are challenging because they require complex electronics for frequency modulation and precise calibration. In comparison, current phase detection methods in GPR systems do not provide the sensitivity required for identification of buried metallic objects.

The background description provided here is for the purpose of generally presenting the context of the disclosure. Unless otherwise indicated here, the material described in this section is not prior art to the claims in this application and is not admitted to be prior art by inclusion in this section.

BRIEF DESCRIPTION OF THE DRAWINGS

At least one example may be understood more fully from detailed description given below and from accompanying drawings, which, however, should not be taken to be limiting, but are for explanation and understanding.

GLOSSARY OF SYMBOLS

Figure 1A:
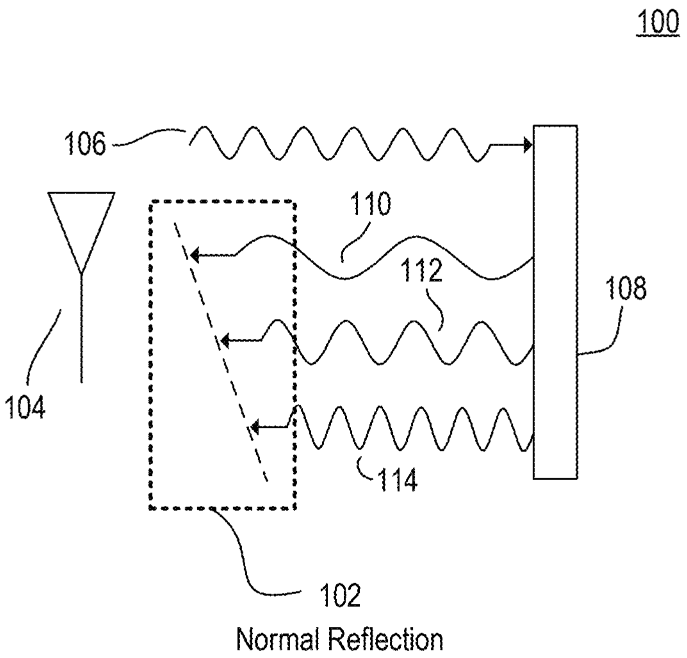
FIG. 1A is a schematic that illustrates normal reflection of waves by an object transmitted from an antenna, in accordance with at least one example.

| | |
|---|---|
| GPR | Ground penetrating radar. |
| MDGPR | Metal detecting ground penetrating radar. |
| FMCW | Frequency-modulated continuous wave. |
| SFCW | Stepped-frequency continuous wave. |
| S11 | Reflection scattering parameter. |
| RF | Radio frequency. |
| PCB | Printed circuit board. |
| SIPPS | Spectrally integrated positive phase slope. |
| Γ1 | Reflection coefficient between antenna and air. |
| Γ2 | Reflection coefficient between soil and metal object. |
| r12 | Reflection coefficient between antenna and soil. |
| r23 | Reflection coefficient between metal object and soil. |
| t12 | Transmission coefficient between antenna and soil. |
| t21 | Transmission coefficient between soil and antenna. |
| t23 | Transmission coefficient between soil and metal object. |
| t32 | Transmission coefficient between metal object and soil. |
| D1 | Distance from antenna to ground. |
| D2 | Depth of the buried metal object. |

DETAILED DESCRIPTION

At least one example discloses an anomalous phase detection method for ground penetrating radars. By analyzing one or more phase reversal patterns in the phase response of a reflected signal, which are exhibited when anomalous phase dispersion is observed, the disclosed method can detect buried metallic objects. At least one example may use a directional antenna to project resonant electromagnetic waves onto a surface. These waves can experience a phase reversal once they encounter metallic objects buried in the surface, and the phase reversal can be observed by analyzing the near field radiation patterns of an antenna. The anomalous phase detection method and associated apparatus can not only detect and localize buried metallic objects but also estimate the distance at which metallic objects are buried below the surface of the ground, in accordance with at least one example.

In at least one example, an anomalous phase detector apparatus for a ground penetrating radar is configured to run an anomalous phase detection method for detecting buried metal objects. In at least one example, the anomalous phase detector is coupled to the ground penetrating radar, wherein the phase of the reflected wave is analyzed for anomalous dispersion in phase patterns, as the anomalous phase patterns may indicate the presence of a buried metal object. In at least one example, the anomalous phase detection method can also increase the accuracy of object detection buried below the surface of the ground, as negligible noise signals are present in the phase response of a ground penetrating radar.

In at least one example, an antenna is hovered over an area having one or more buried metal objects. A radio frequency module is used to feed a radio frequency signal to an antenna, and the antenna transmits electromagnetic waves into its ambient environment. Once the waves penetrate the subsurface and hit a buried metal object, they are reflected towards the antenna with a modified phase that can be measured by a phase detector. If the metal is buried at a particular distance below the surface of the ground, a unique phase response is observed that can be detected by the phase detector. The unique phase response is characterized by a double slope shift, hereby called an anomalous phase response. This anomalous phase response indicates the presence of a buried metal object below the surface of the ground over which the antenna was hovered. The distance at which a metal object is buried can be estimated from the distance at which the antenna exhibits the anomalous phase response.

In at least one example, a directional antenna is one of Yagi-Uda antenna, a log-periodic antenna, a dipole antenna, a patch antenna, a parabolic reflector antenna, a horn antenna, or a helical antenna which can be used to detect a buried metal object. In at least one example, the directional antenna is supplied with a radio frequency signal through a balun for impedance matching, and one or more director elements can be used to increase the directivity of the directional antenna. In at least one example, the directional antenna, the balun, and the director elements are etched on a printed circuit board.

In the following description, numerous details are discussed to provide a detailed explanation of examples of the present disclosure. It will be apparent, however, to one skilled in the art, that examples of the present disclosure may be practiced without these specific details. In other instances, well-known structures and devices are shown in block diagram forms rather than in detail to avoid obscuring examples of the present disclosure.

Note that in the corresponding drawings of the examples, signals are represented with lines. Some lines may be thicker to indicate more constituent signal paths and/or have arrows at one or more ends to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

It is pointed out that those elements of the figures having the same reference numbers (or names) as the elements of any other figure can operate or function in any manner like that described but are not limited to such.

FIG. 1A is a schematic 100 that illustrates a normal reflection pattern 102, observed in the waves received at an antenna 104, which are originally transmitted by antenna 104 and are reflected by a medium 108, in accordance with at least one example. In case of normal reflection pattern 102, antenna 104 transmits a signal band 106 of RF signals comprising low, medium, and high frequencies. Incident signal comprising signal band 106 is reflected from medium 108, and reflected waves return to antenna 104 without experiencing a dispersion in the phase, meaning that one or more waves of different frequencies—low frequency wave 110, medium frequency wave 112, and high frequency wave 114—contained in the reflected signal are travelling with approximately the same propagation speeds. This results in preservation of the shape of a wave as it propagates through an environment and shows that reflection medium 108 is a non-resonant medium.

Figure 1B:
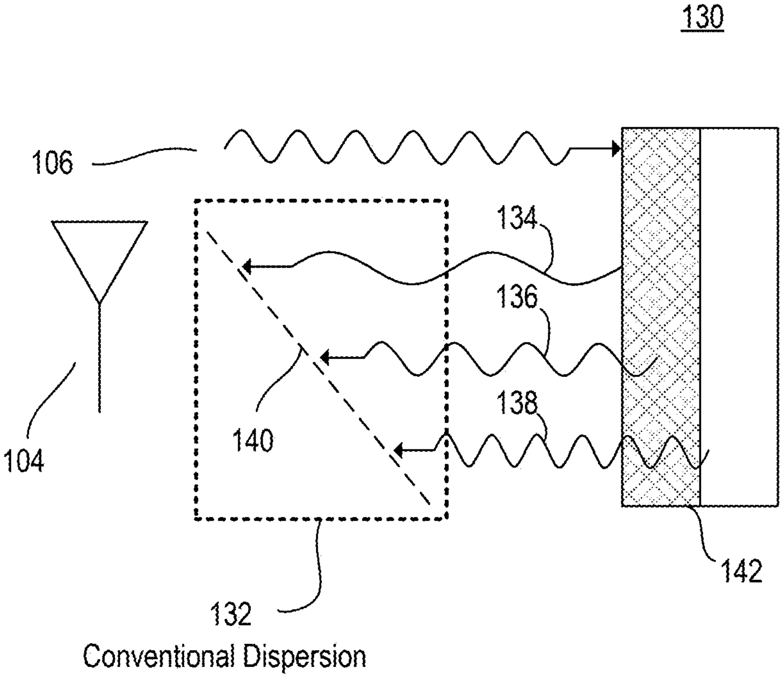
FIG. 1B is a schematic that illustrates dispersion observed in the reflection of waves by an object transmitted from an antenna, in accordance with at least one example.

FIG. 1B is a schematic 130 that illustrates a dispersion pattern 132, observed in the waves received at an antenna 104, which are originally transmitted by antenna 104 and are reflected by a non-resonant medium 142, in accordance with at least one example. Dispersion pattern 132 is typically observed in a natural environment. In case of conventional dispersion pattern 132, antenna 104 transmits a signal band 106 of RF signals comprising low, medium, and high frequencies. Incident signal comprising signal band 106 is reflected from non-resonant medium 142, and reflected waves return to antenna 104 experiencing a dispersion in the phase, meaning the reflected waves 134, 136, and 138 from non-resonant medium 142 propagate with varying speeds. This results in a spreading pattern 140, as reflected wave 134 is travelling at a relatively greater speed compared that of reflected waves 136 and 138.

Figure 1C:
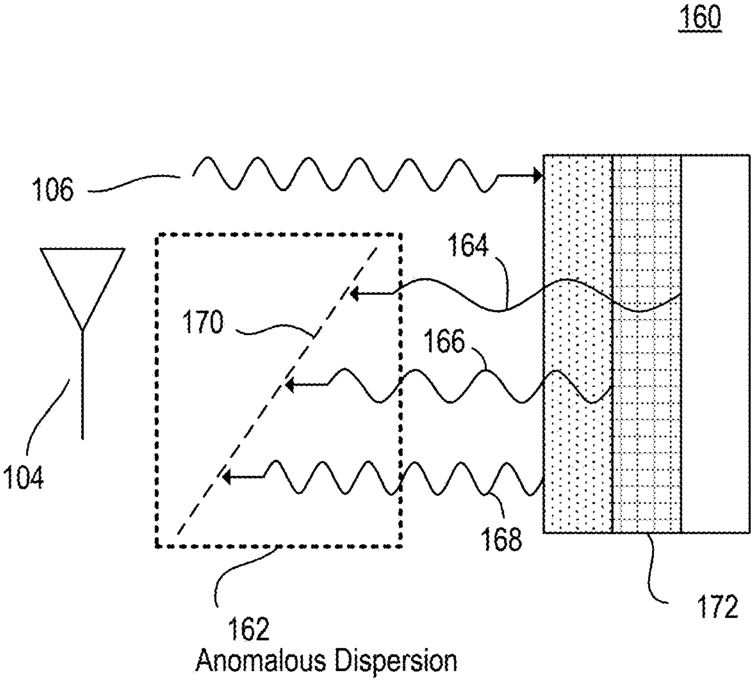
FIG. 1C is a schematic that illustrates anomalous dispersion observed in the reflection of waves by an object transmitted from an antenna, in accordance with at least one example.

FIG. 1C is a schematic 160 that illustrates an anomalous dispersion pattern 162, observed in the waves received at an antenna 104, which are originally transmitted by antenna 104 and are reflected by a resonant medium 172, in accordance with at least one example. In the case of anomalous dispersion pattern 162, antenna 104 transmits a signal band 106 of RF signals comprising low, medium, and high frequencies. Incident signal comprising signal band 106 is reflected from resonant medium 172, and reflected waves return to antenna 104 experiencing an anomalous dispersion in the phase, meaning the reflected waves 164, 166, and 168 from resonant medium 172 propagate with varying speeds. This results in a spreading pattern 170, as reflected wave 168 is travelling at a relatively greater speed compared that of reflected waves 166 and 164. This means a wave with a relatively higher frequency is travelling at a relatively greater speed compared with that of the waves with lower frequencies, and this phenomenon is opposite to anomalous dispersion pattern 132 observed in FIG. 1B, where a wave with a relatively lower frequency is travelling at a relatively greater speed compared with that of the waves with higher frequencies. Consequently, spreading pattern 170 defines anomalous dispersion pattern 162, and in comparison, spreading pattern 140 defines anomalous dispersion pattern 132.

An anomalous dispersion pattern 162 defines the working principle of a metal detecting ground penetrating radar that detects anomalies in the phase of reflected waves and provides insights about characterization of material objects buried below the surface of the ground. FIG. 1A, FIG. 1B, and FIG. 1C show different spreading patterns, commonly known as dispersion characteristics, that are observed in the waves reflected from resonant or non-resonant mediums.

Figure 2A:
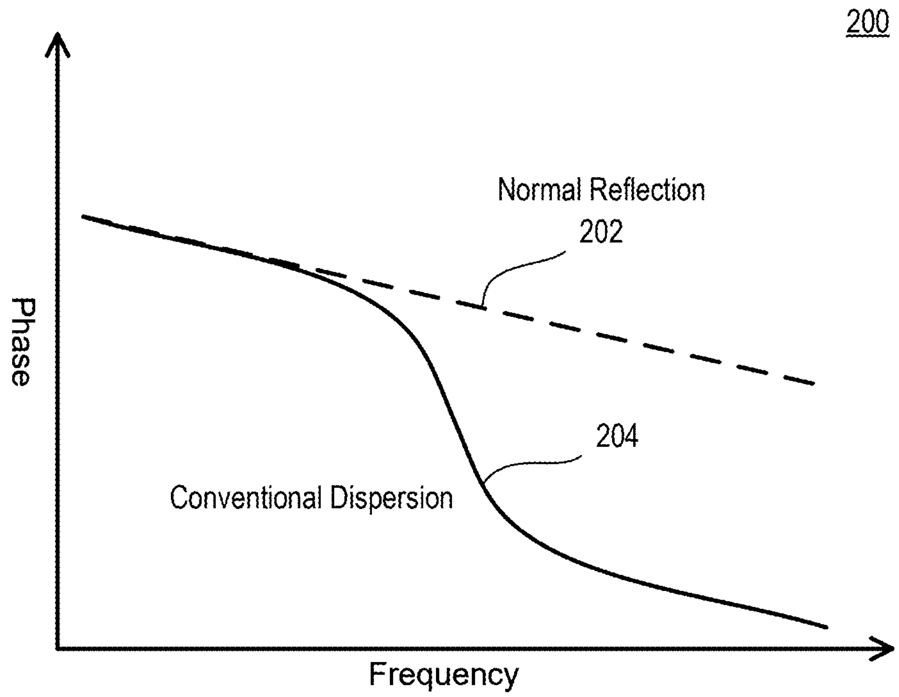
FIG. 2A is a plot that illustrates the dispersion characteristics in a phase of waves transmitted from an antenna once they are reflected by different types of surfaces, in accordance with at least one example.

FIG. 2A is a plot 200 that illustrates dispersion characteristic curves 202 and 204 observed in the phase of waves, received at an antenna, after they are reflected by different types of resonant and non-resonant mediums, in accordance with at least one example. Once waves do not experience dispersion then normal reflection pattern represented by curve 202 is observed at the antenna of a metal detecting ground penetrating radar. This shows that phase changes linearly with an increase in frequencies in a frequency band. The reflection coefficient of the reflected waves remains relatively constant in the frequency band. Conventional dispersion pattern, represented by curve 204, is observed at the antenna of a metal detecting ground penetrating radar when transmitted waves are reflected from a non-resonant medium buried under the surface of the ground. In this scenario, the phase response of the reflected waves shows a pattern like that of the case of normal reflection till a particular signal frequency. After this frequency, the rate of change of phase remains significantly large for a certain range of frequencies, and after this range, it again starts decreasing linearly; as a result, an exponentially decreasing bend in curve 204 can be observed in FIG. 2A.

Figure 2B:
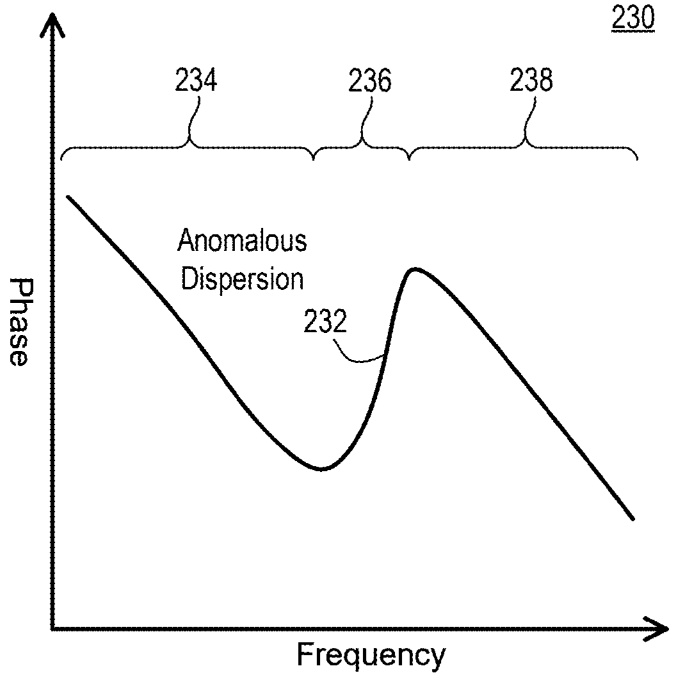
FIG. 2B is a plot that illustrates anomalous dispersion characteristics in a phase of waves transmitted from an antenna once they are reflected by a resonant medium such as a buried metal object, in accordance with at least one example.

FIG. 2B is a plot 230 that illustrates anomalous dispersion pattern, represented by curve 232, is observed at the antenna of a metal detecting ground penetrating radar when transmitted waves are reflected from a resonant medium buried under the surface of the ground, in accordance with at least one example. In a low frequency band 234, the phase of the reflected waves decreases linearly with an increase in the frequency of the transmitted signal. In a middle frequency band 236, the variations in phase start exhibiting anomalous dispersion patterns shown by a sharp increase in phase. In a high frequency band 238, the increasing pattern of phase is again reversed, and the phase again starts decreasing significantly. An analysis of curve 232 shows that the slope of phase reverses twice: first slope shift is from a decrease in phase to a sharp increase in phase, and a second one when a sharp increase in phase is followed by a sharp decrease in phase. This double slope-shift dispersion phenomenon defines an anomalous dispersion or anomalous phase pattern, which is different and unique from curve 202 (normal reflection curve) and curve 204 (conventional dispersion curve) of FIG. 2A.

Figure 3:
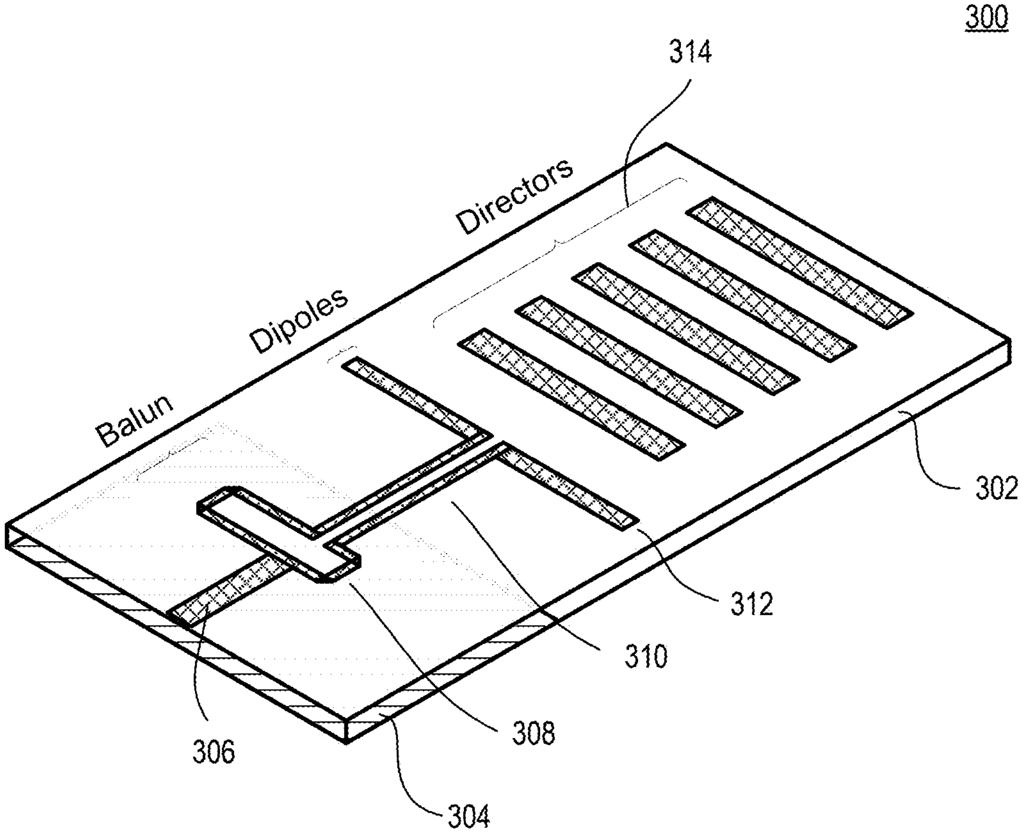
FIG. 3 is a schematic that illustrates a Yagi-Uda antenna and a microstrip balun placed on a printed circuit board, in accordance with at least one example.

FIG. 3 is a schematic of Yagi-Uda antenna 300, in accordance with at least one example. The choice of antenna plays a role in detecting anomalous dispersion pattern in the phase of reflected waves from a resonant medium. A Yagi-Uda antenna has a directed end fire radiation pattern, therefore, in at least one example, a Yagi-Uda antenna 300 can be etched on a substrate 302 of a printed circuit board (PCB) (e.g., Rogers RO4350B). In this example, substrate 302 has a thickness of 1.52 mm. This thickness is empirically determined to meet the functional requirements of antenna design, and to maintain its mechanical stability. A copper metal layer with a thickness of 0.035 mm is used on the top and bottom planes of substrate 302. Yagi-Uda antenna 300 comprises a feed 306, a balun 308, coplanar lines 310, and a driving element such as dipole 312. Feed 306 supplies RF signals to antenna 300 through a balun 308 that is configured to match the impedance of Yagi-Uda antenna 300 with an RF signal module. Coplanar lines 310 feed RF signals from balun 308 to elements like dipole 312. Antenna 300 also includes a ground plate 304 and an array comprising five director elements 314 to increase the bandwidth and gain of Yagi-Uda antenna 300. In at least one example, dipole 312 operates at 2.35 GHz. This frequency choice is empirically determined to achieve desirable electrical properties, including a low loss tangent of 0.0037 and a dielectric constant of 3.66. These properties help in efficiently propagating signals within antenna 300 by reducing signal loss.

Figure 4:
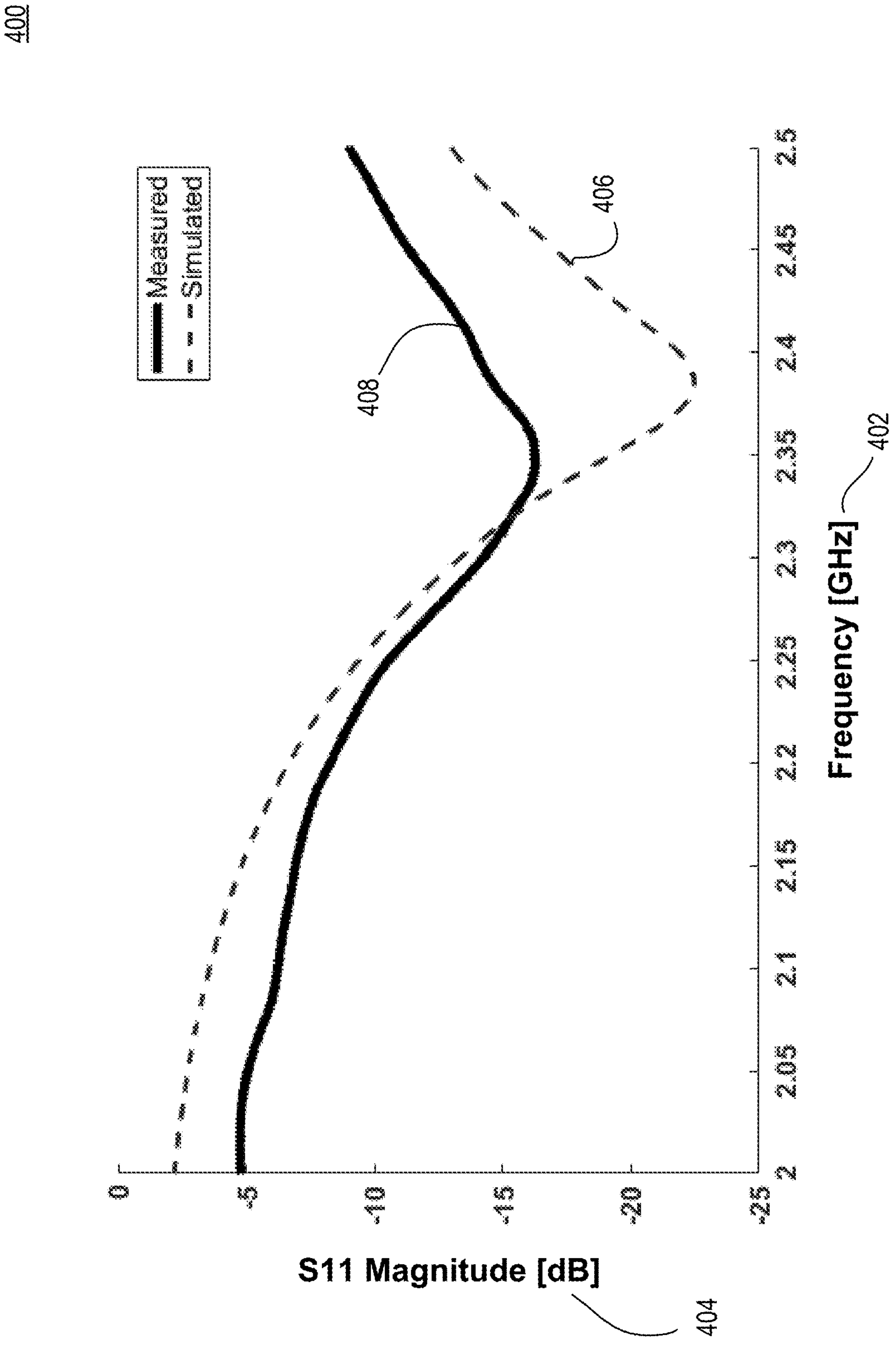
FIG. 4 is a comparative plot of measured and simulated magnitude response (S11) of directional antenna of FIG. 3 across a frequency spectrum, in accordance with at least one example.

FIG. 4 is a comparative plot 400 of measured and simulated magnitude response (S11) of a directional antenna such as directional antenna 300 of FIG. 3 across a frequency range 402 starting from 2 GHz and ending at 2.5 GHZ, in accordance with at least one example. The vertical axis represents the magnitude of scattering parameter S11 404 in dBs, while the horizontal axis represents the frequency range 402 in gigahertz (GHz). The behavior of simulated reflection scattering parameter (S11) of directional antenna 300 is shown by curve 406, whereas the behavior of measured S11 of directional antenna 300 is shown by curve 408. The simulated and the measured responses represented by curves 406 and 408 respectively, differ slightly between 2.20 and 2.35 GHz frequency band: the simulated response of reflection scattering parameter (S11) 406 exhibits a relatively larger dip compared to the measured response of reflection scattering parameter (S11) 406. The drop, however, signifies a significant reduction in the magnitude of S11 for both responses: reaching less than −15 dB and −20 dB at 2.35 GHz for the measured and simulated responses, respectively. After 2.35 GHz, S11 in both responses show a continuously increasing trend, however S11 of the measured response (curve 408) remains consistently higher compared with S11 of the simulated response. Approximately at 2.45 GHZ, curve 406 also shows an increasing trend for S11 of the simulated response reaching −13 dB; while, for S11 of the measured response (curve 408) also shows an increasing trend after 2.37 GHz approaching −8 dB at 2.45 GHz. The analysis of curve 408 shows that directional antenna 300 of FIG. 3 resonates at 2.35 GHZ.

Figure 5:
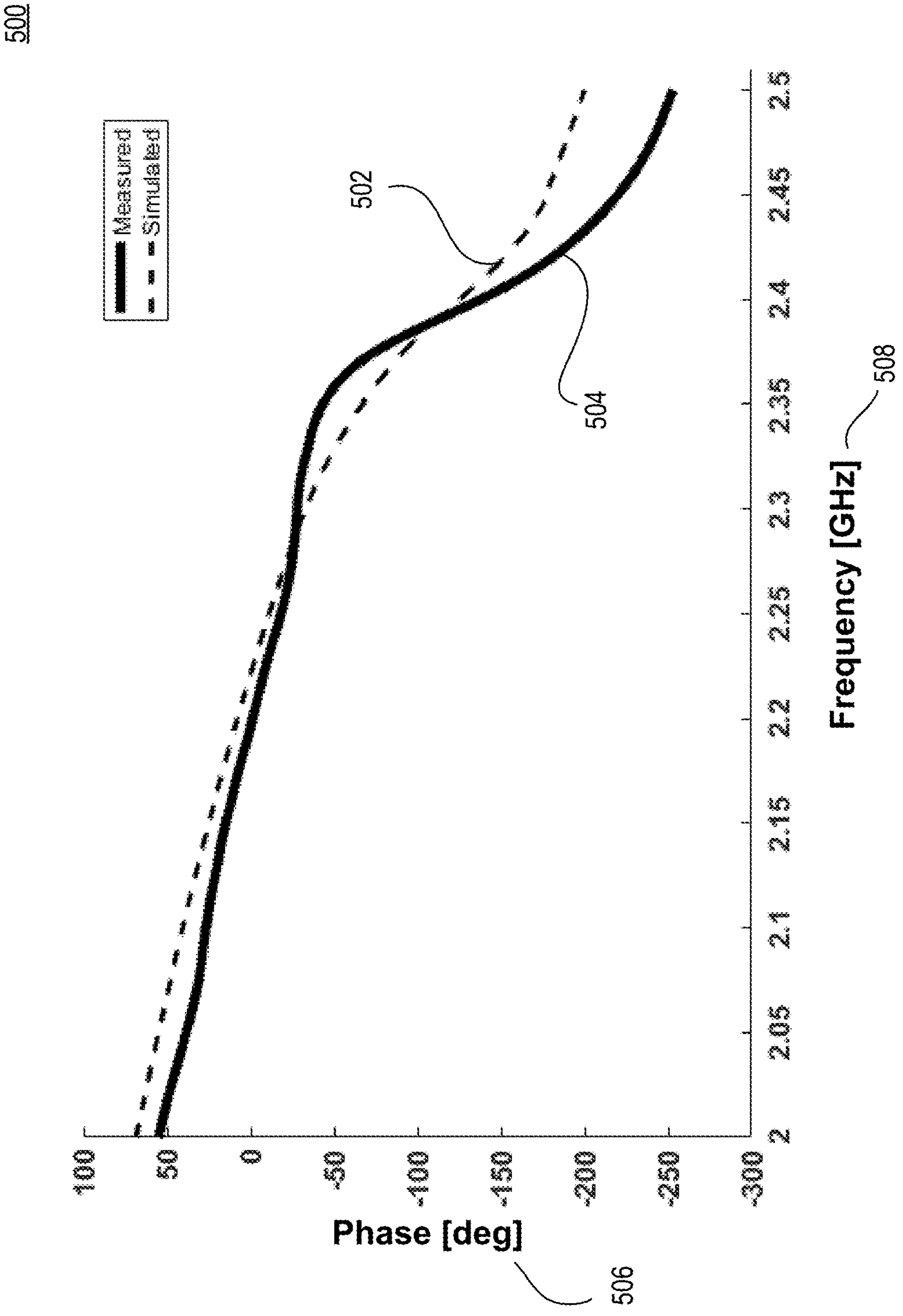
FIG. 5 is a comparative plot of measured and simulated phase response of a directional antenna of FIG. 3 across a frequency spectrum, in accordance with at least one example.

FIG. 5 is a comparative plot 500 of the phase response of directional antenna 300 of FIG. 3, showing both simulated and measured phase changes of reflection scattering parameter S11, represented by curves 502 and 504 respectively, in accordance with at least one example. The vertical axis represents a phase range 506 of reflection scattering parameter S11 in degrees, while the horizontal axis represents the frequency band 508 in gigahertz (GHz). At 2 GHz, both curves 502 and 504 start at about 50 degrees phase and show a linearly decreasing trend as frequency band 508 increases, and both curves 502 and 504 keep on closely following each other till the frequency reaches 2.35 GHZ, and this shows a strong correlation between the results of simulations and the real world. After 2.35 GHZ, a significant variation in phase of reflection scattering parameter S11 is observed for both curves 502 and 504; the measured phase of S11 exponentially decreases from −10 at 2.35 GHz to −250 degrees at 2.5 GHZ, while the simulated phase of S11 reduces from −50 at 2.35 GHz to −200 degrees. Plot 500 shows changes in the phase response of S11 when transmitted waves are reflected from a non-resonant material object, hence this pattern, as expected, is like curve 204 as shown in FIG. 2A.

Figure 6:
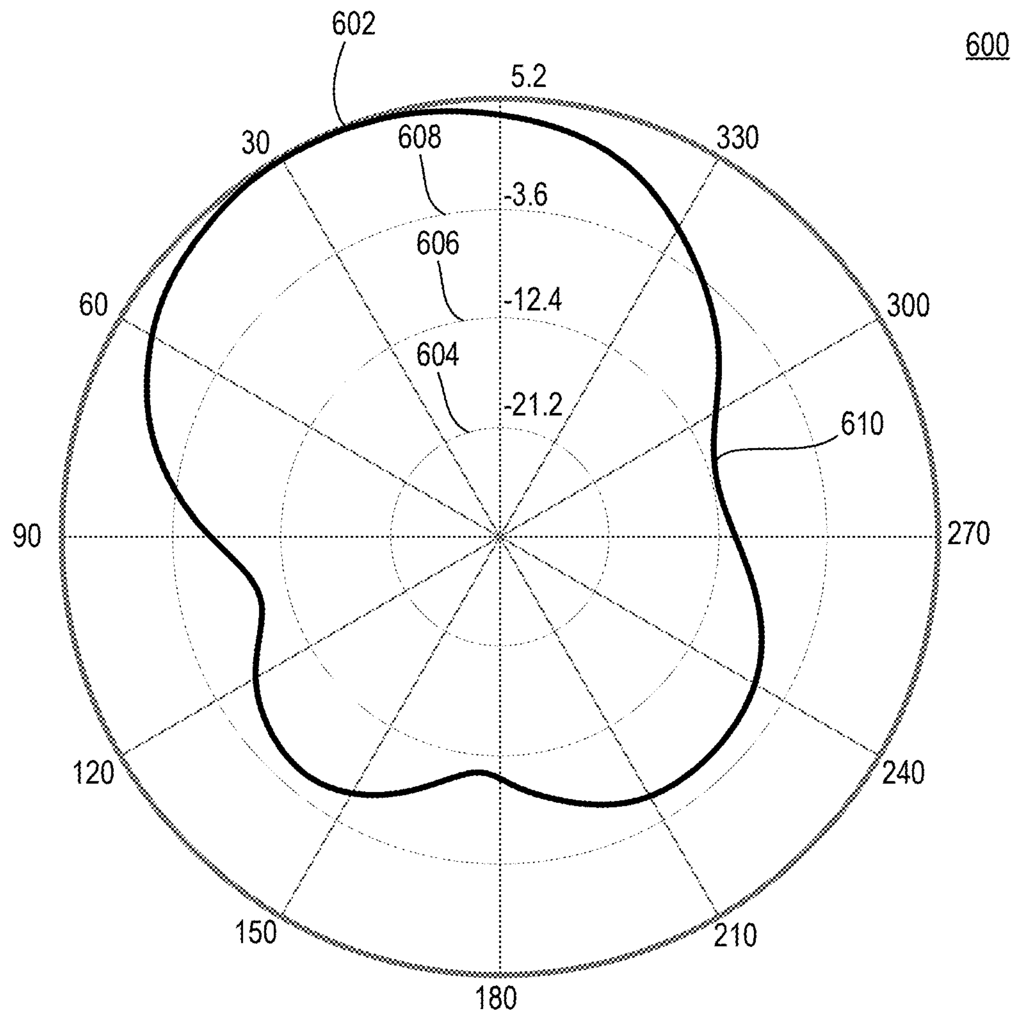
FIG. 6 is a plot of a radiation pattern of directional antenna of FIG. 3, in accordance with at least one example.

FIG. 6 is a plot 600 of a radiation pattern 610 of antenna 300 of FIG. 3, in accordance with at least one example. Primary lobe 602 of radiation pattern 610 extends to 30 degrees, with a peak value of 5.2 dB that represents the maximum radiation intensity of antenna 300. The radiation intensity decreases significantly as the angle deviates from primary lobe 602. Concentric circles are shown within the radiation patterns, indicating specific attenuation levels of radiation intensity. Circle 604 corresponds to an attenuation level of −21.2 dB, representing the highest level of attenuation. Circle 606 indicates an attenuation of −12.4 dB, showing a relatively lower degree of attenuation compared to that of circle 604. Circle 608 represents an attenuation level of −3.6 dB, showing that attenuation is further reduced compared to that of circle 606. These attenuation levels show how efficiently antenna 300 can focus energy in a particular direction at a particular angle compared with primary lobe 602, and how much intensity would be reduced at a particular angle compared with that of the intensity of primary lobe 602, in accordance with at least one example.

Figure 7:
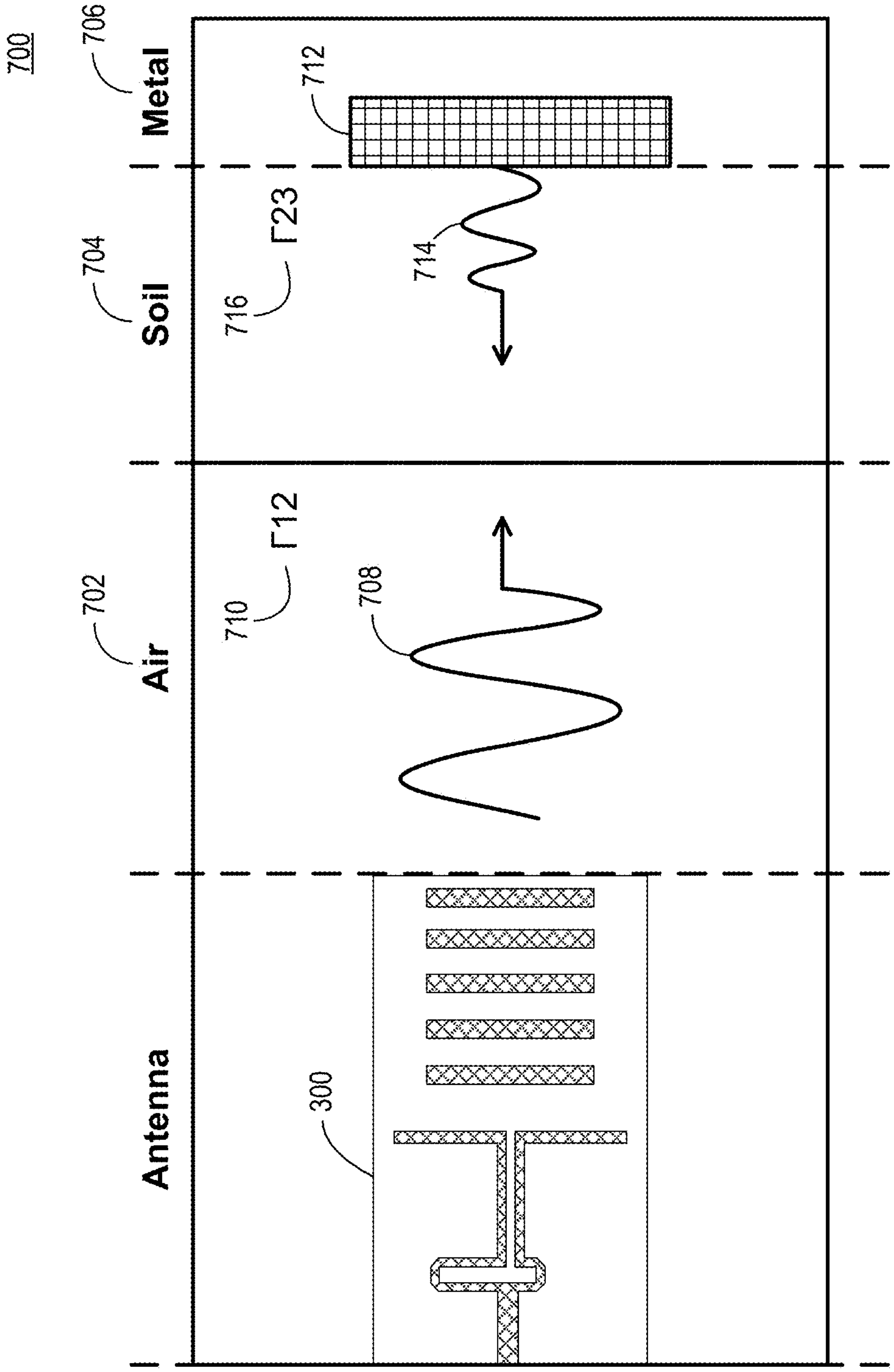
FIG. 7 is a schematic that illustrates a multilayer scattering model of a metal detecting ground penetrating radar, in accordance with at least one example.

FIG. 7 is a schematic that illustrates a multilayer scattering model 700 of a metal detecting ground penetrating radar that can detect buried metal objects, in accordance with at least one example. Model 700 shows three distinct layers through which radio frequency waves propagate on their journey from antenna 300 to a buried metal object 712: an air layer 702, a soil layer 704, and a metal layer 706. Antenna 300 transmits radio frequency waves 708, which propagate through air layer 702 before entering soil layer 704. The interface between air layer 702 and soil layer 704 represents a boundary of interest, as the properties of the two mediums differ significantly from one another, affecting the transmission and reflection patterns of transmitted radio frequency waves. Once transmitted, radio frequency waves 708 are incident on the boundary between air layer 702 and soil layer 704, a fraction of radio frequency waves is reflected back into air layer 702, wherein the fraction is a function of a reflection coefficient Γ12 710 of soil layer 704; while a fraction of the remaining waves penetrate through soil layer 704. Reflection coefficient Γ12 710 is computed using parameters like relative permittivity (εr) and conductivity (σ) of the air and soil, in accordance with at least one example.

Once inside soil layer 704, radio frequency waves continue their propagation in soil layer 704 until they encounter a metal object 712 buried in soil layer 704. Metal object 712 has a significantly different and unique electromagnetic signature compared to that of the surrounding soil, therefore, a large fraction of radio frequency waves is reflected represented by a corresponding signal 714. Reflection coefficient Γ23 between the boundary of soil layer 704 and metal object 712 is a function of high conductivity and permittivity of metal object 712, therefore, it results in an approximately total reflection of incident radio frequency waves. Frequency waves reflected from buried metal object 712, again propagate in soil layer 704, and reach boundary of soil layer 704 and air layer 702. At this boundary, a fraction of waves, determined by reflecting coefficient Γ12 710, are transmitted to air layer 702 and a fraction of waves are reflected to soil layer 704. The reflection and penetration patterns of radio frequency waves in each medium—air layer 702, soil layer 704, and metal layer 706—determined by respective reflecting coefficients, Γ12 710 and Γ23 716, of boundaries between air layer 702 and soil layer 704 and between soil layer 704 and metal layer 706 respectively, defines the accuracy, precision, and effectiveness of a metal detecting ground penetrating radar. The overall wave scattering phenomenon comprises of reflections from multiple layers, and therefore, can be modelled as a one-dimensional multiple scattering problem using following equations (1) and (2):

$$\Gamma 1 = r12 + \frac{t21 \cdot t12 \cdot \Gamma 2 \cdot e^{-i \cdot 2 \cdot n1 \cdot d1}}{1 - r21 \cdot \Gamma 2 \cdot e^{-i \cdot 2 \cdot n1 \cdot d1}} \text{ and} \tag{1}$$

$$\Gamma 2 = r23 + \frac{t32 \cdot t23 \cdot r34 \cdot e^{-i \cdot 2 \cdot n2}}{1 - r32 \cdot r34 \cdot e^{-i \cdot 2 \cdot n2 \cdot d2}} \tag{2}$$

where Γ1 is a reflection coefficient between antenna 300 and air layer 702, and Γ2 is the reflection coefficient between soil layer 704 and metal layer 706, r12 is the reflection coefficient between soil layer 704 and antenna 300, and r23 is the reflection coefficient between metal layer 706 and soil layer 704. Similarly, t12, t21, t32, and t23 are the transmission coefficients of different layers.

Figure 8A:
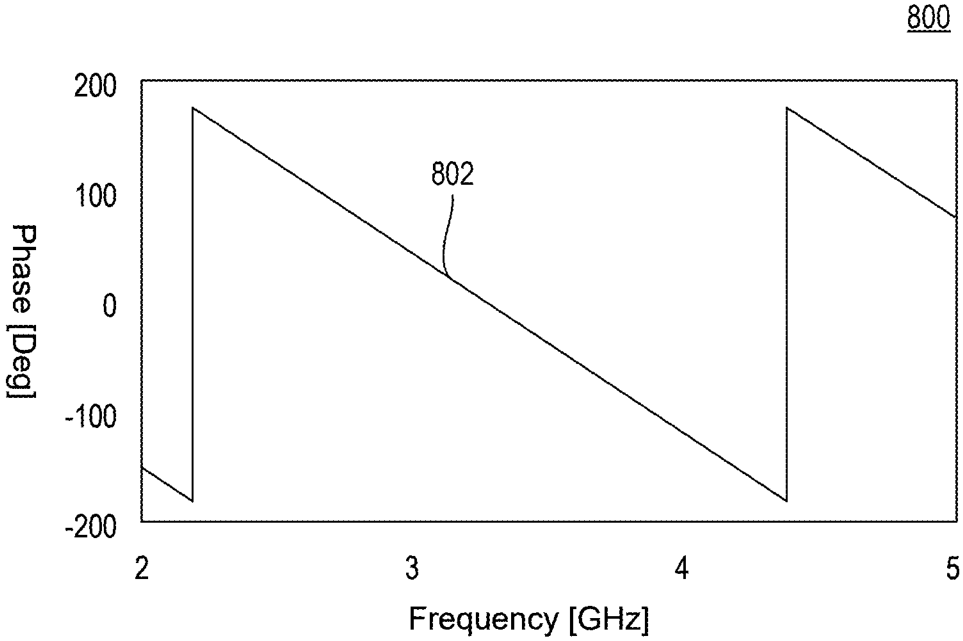
FIG. 8A is a plot that illustrates the phase response of a ground penetrating radar when transmitted waves are not reflected, in accordance with at least one example.

FIG. 8A is a plot 800 that illustrates the phase response of antenna 300, a ground penetrating radar, when waves are not reflected, in accordance with at least one example. Phase curve 802 shows that the phase of antenna 300 exhibits a gradual and recurring negative gradient when no object is present in the field of antenna 300. This phase response can now act as a benchmark for other scenarios when objects of different types are present in the field of antenna 300.

Figure 8B:
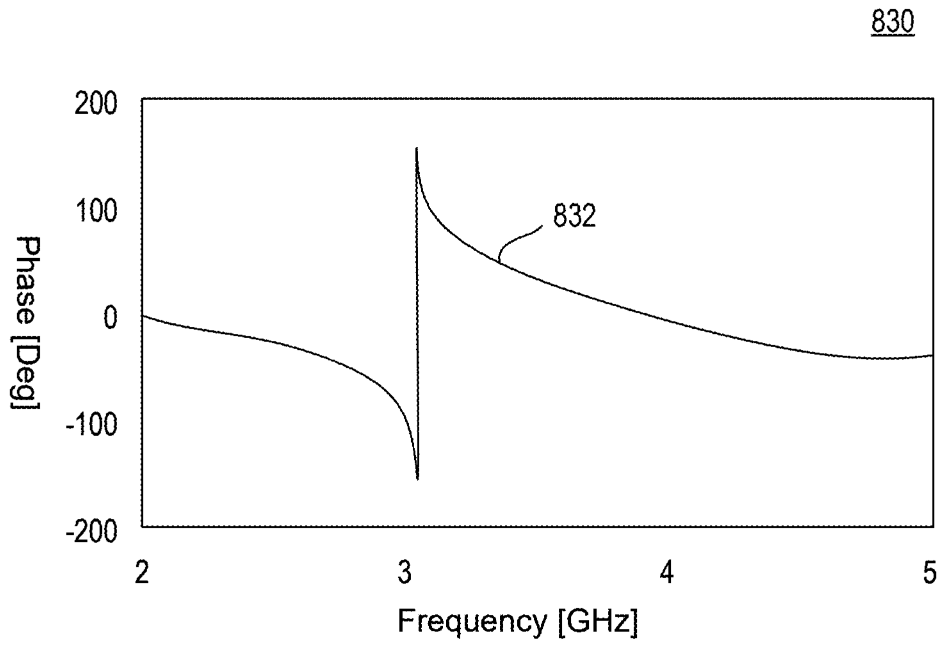
FIG. 8B is a plot that illustrates the phase response of a ground penetrating radar when transmitted waves are reflected from a non-metallic object, in accordance with at least one example.

FIG. 8B is a plot 830 that illustrates the phase response of antenna 300 of a ground penetrating radar, when waves are reflected from a non-resonant object, in accordance with at least one example. Phase curve 832 shows that phase of the reflected wave, received at antenna 300, exhibits a negative and non-gradual gradient when a non-resonant object is present within the field of antenna 300. The pattern of phase curve 832 is comparable to that of phase curve 802, indicating that the presence of non-resonant object may not significantly alter the phase variations of reflected radio frequency waves.

Figure 8C:
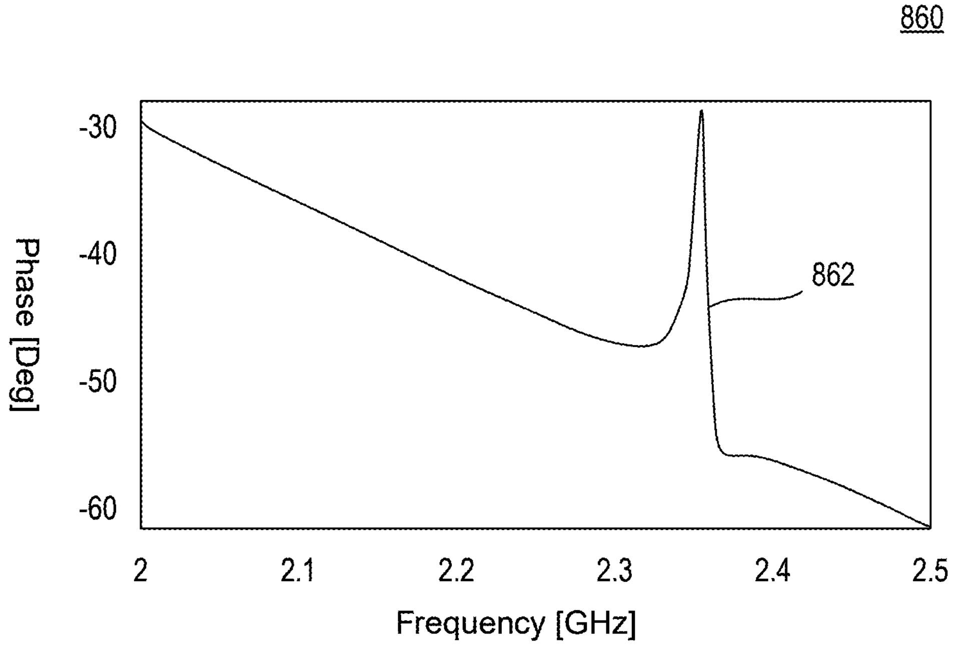
FIG. 8C is a plot that illustrates the phase response of a ground penetrating radar when transmitted waves are reflected from a metallic object, in accordance with at least one example.

FIG. 8C is a plot 860 that illustrates the phase response of antenna 300 of a ground penetrating radar when waves are reflected from a resonant (e.g., metallic) object, in accordance with at least one example. Phase curve 862 shows that phase of the reflected wave exhibits an anomalous phase distortion when a metallic object is present within the field of antenna 300. Phase curve 862 has an overall negative gradient with an anomalous behavior occurring at an approximate frequency 2.35 GHz. This anomalous phase behavior is characterized by a positive gradient of phase curve 862, which is different and unique compared to phase curves 802 and 832. By detecting the variations in the phase patterns, shown in curves 832 and 862, it is possible to detect the type of object present within the field of antenna 300.

Figure 9:
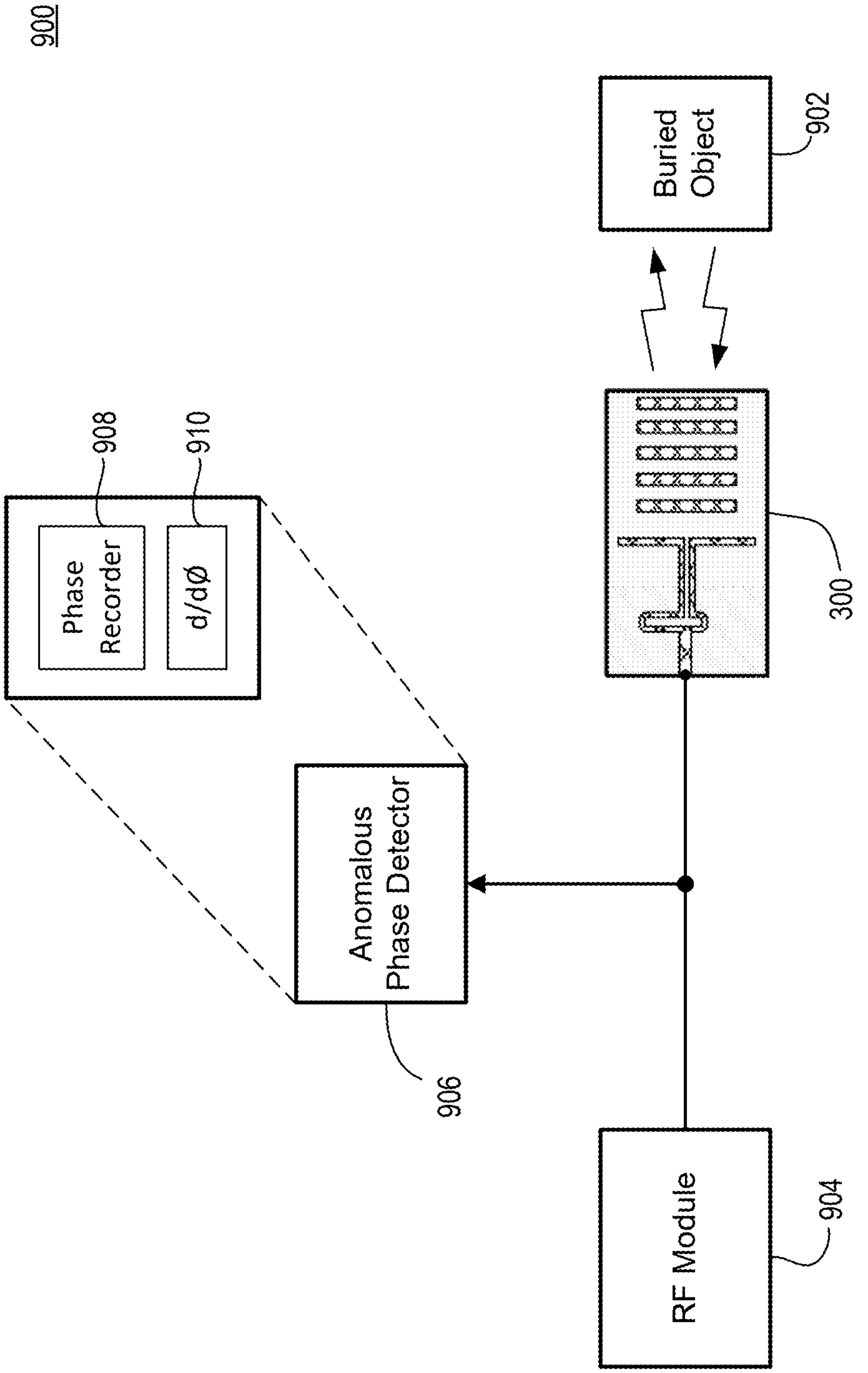
FIG. 9 is a schematic that illustrates a metal detecting ground penetrating radar module that can detect a buried metal object using a directional antenna, in accordance with at least one example.

FIG. 9 is a schematic that illustrates a metal detecting ground penetrating radar (MDGPR) system 900 that can detect a buried metal object, which acts as a buried reflector 902, using antenna 300, in accordance with at least one example. System 900 comprises an RF module 904, an anomalous phase detector 906, and directional antenna 300. RF module 904 generates an RF signal which is transmitted by directional antenna 300. Buried reflector 902 interacts with system 900 by reflecting RF signal generated by RF module 904. In at least one example, buried reflector 902 serves as a passive element that changes the phase of an RF signal once it is reflected, thereby helping in detecting metal objects.

System 900 uses directional antenna 300 in a monostatic configuration that can operate in near field applications to transmit RF signals provided to it by RF module 904. In at least one example, anomalous phase detector 906 can record, measure, and detect anomalous variations in the phase of RF signal, received at directional antenna 300 and reflected by buried reflector 902 (e.g., a metal object). In at least one example, anomalous phase detector 906 comprises a phase recorder 908 and a slope evaluator 910. In at least one example, phase recorder 908 can record the phase of a reflected RF signal at a given frequency, and slope evaluator 910 can compute the derivative of a recorded phase and detect anomalies in the variations of the recorded phase. In at least one example, slope evaluator 910 analyzes the slope of the recorded phase of RF signals, and scans for a presence of a dual slope shift. If the dual slope shift is detected in the phase response of the reflected signal, it confirms the presence of a metal object in the near field of directional antenna 300.

Figure 10:
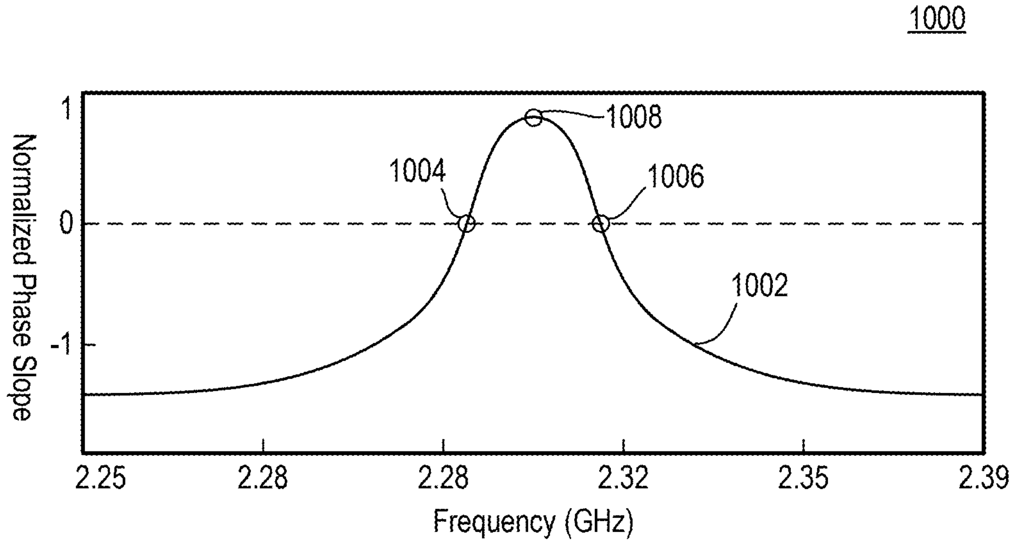
FIG. 10 is a plot that illustrates the functioning of an anomalous phase detector of in accordance with at least one example.

FIG. 10 is a plot 1000 that illustrates how the anomalous phase detector 906 of FIG. 9 can detect anomalous dispersion in phase response, in accordance with at least one example. When directional antenna 300 is hovered over a surface area of the ground, the phase of the reflected waves received at directional antenna 300 is recorded by phase recorder 908. This phase is subsequently processed by slope evaluator 910. In at least one example, the derivative of phase curve is computed by slope evaluator 910, thereby recording and plotting corresponding slope curve 1002 of the anomalous phase response. Slope curve 1002 helps in detecting anomalous variations in the phase of reflected RF signals. For example, slope curve 1002 includes two zero crossings 1004 and 1006 that indicate a double slope shift in phase response curve. Once a double slop shift is detected, it may be signaled by turning on an LED or ringing an alarm, indicating the presence of a metal object. In at least one example, maximum positive phase slope 1008 may be spectrally integrated to a set of one or more scanning distances to obtain a spectrally integrated positive phase slope (SIPPS) plots, which may assist in estimating the depth at which a metal object is buried below the surface of the ground.

Figure 11:
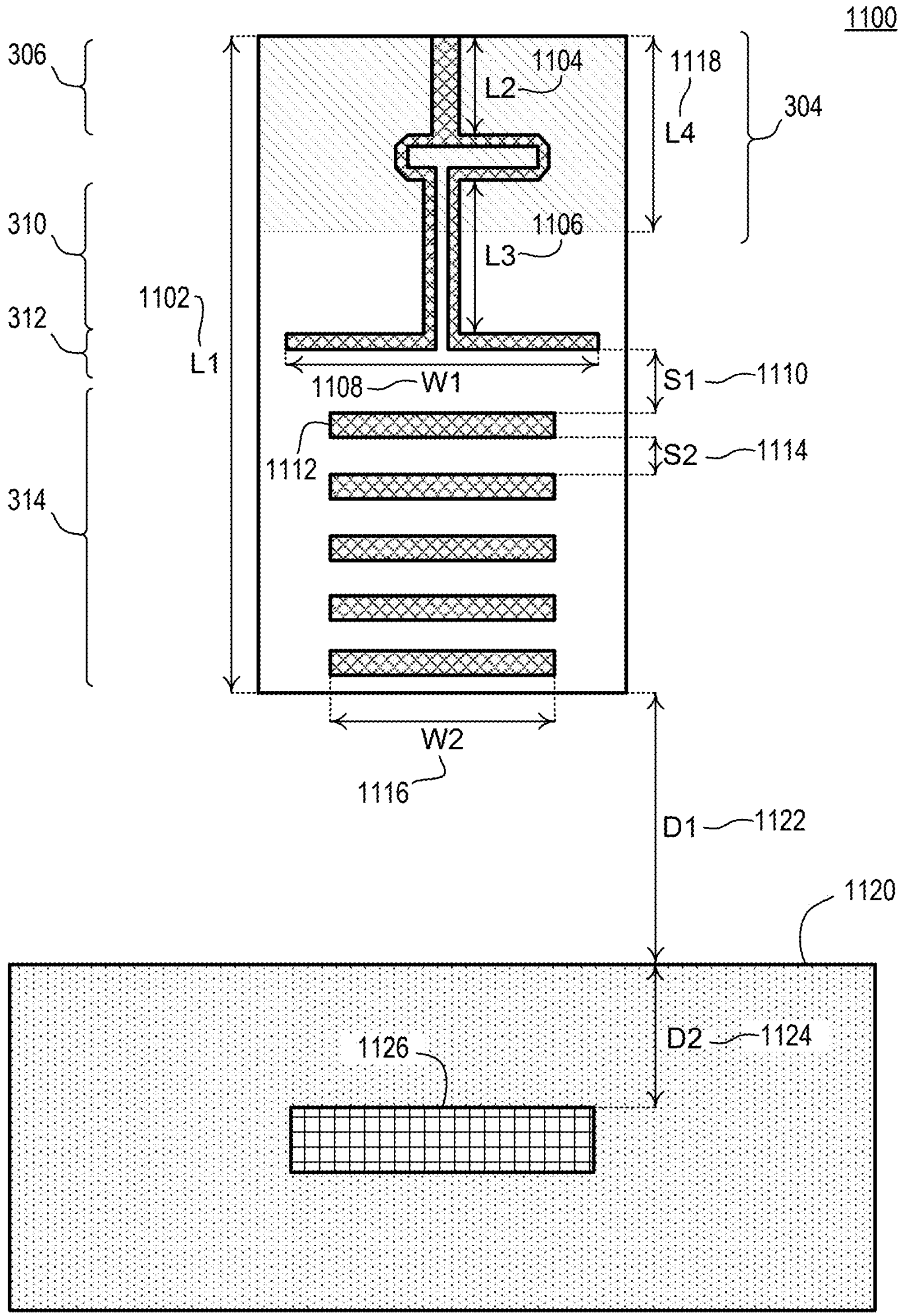
FIG. 11 is a schematic that illustrates the dimensions and scanning distances of a directional antenna of FIG. 3, in accordance with at least one example.

FIG. 11 is a schematic 1100 that illustrates the dimensions and scanning distances of directional antenna 300 of FIG. 3, in accordance with at least one example. Directional antenna 300 is designed with a length L1 1102 of 130 mm. Here, length L2 1104 of feed 306 is 6.8 mm, length L3 1106 of coplanar lines 310 is 36.5 mm, width W1 1108 of dipole 312 is 29.4 mm, spacing S1 1110 between dipole 312 and first director element 1112 is 12 mm, and spacing S2 1114 between subsequent director elements 314 is 9.5 mm. The width W2 1116 of one or more director elements 314 is 26.4 mm and length L4 1118 of ground plate 304 (herein also ground reflector) is 25 mm, in accordance with at least one example.

The distance from the surface of ground 1120 at which an antenna 300 exhibits anomalous phase response is D1 1122. In a similar way, a buried metal object 1126 is hidden at a distance D2 1124 below the surface of ground 1120. The combined distance D1 1122 and D2 1124 remains constant at 0.52 for the first harmonic of the wave reflected by a metal object 1126. As depth of D2 1124 of buried metal object is increased beyond the first harmonic of the wave reflected by a metal object 1126, the anomalous phase behavior is detected at a distance D1 given by equation (3).

$$D1 = n\frac{\lambda}{2} + D2 \tag{3}$$

where n represents the number of harmonics. Since distance D1 1122 of antenna 300 is known, depth D2 1124 of metal object 1126 can be calculated using equation (3). Equation (3) may also be written as:

$$D1 = nD' + D2 \tag{4}$$

where D' is the distance at which antenna 300 exhibits anomalous phase behavior when a metal object is placed directly on the surface of the ground. In at least one example, if antenna 300 exhibits anomalous phase behavior when scanned at a distance D1, D2 can be computed using equations (3) and (4) since λ of antenna 300 is already known being a design parameter of antenna 300.

Figure 12A:
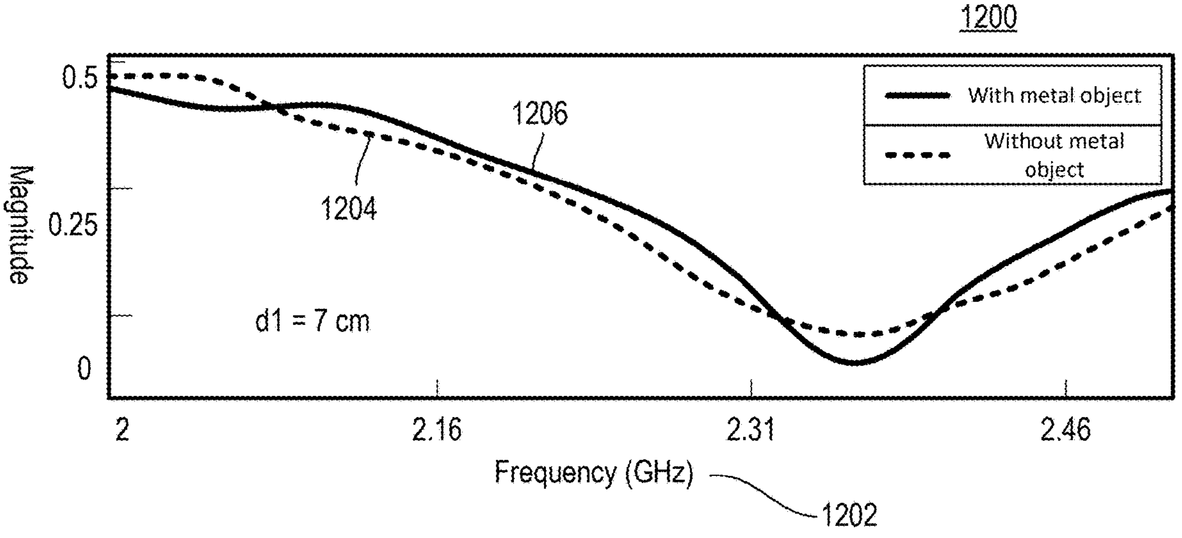
FIG. 12A is a plot that illustrates the magnitude of the reflection scattering parameter S11 of a directional antenna placed at 7 cm above the surface of the ground, in accordance with at least one example.

FIG. 12A is a plot 1200 that shows a normalized magnitude of the reflection scattering parameter S11 of directional antenna 300 over a frequency range 1202 of 2 GHz to 2.5 GHz, in accordance with at least one example. Curve 1204 represents the normalized magnitude of the reflection scattering parameter S11 when no metal object is present under directional antenna 300; and curve 1206 represents the magnitude of the normalized reflection scattering parameter S11 when a buried metal object is present within the field of directional antenna 300 at a distance D1 1122 of 7 cm and D2 1124 of 4 cm, respectively. Plot 1200 shows that in these cases, it is not possible to detect a buried metal object, as the variations in the magnitude of the reflection scattering parameter S11 for both cases is not significant.

Figure 12B:
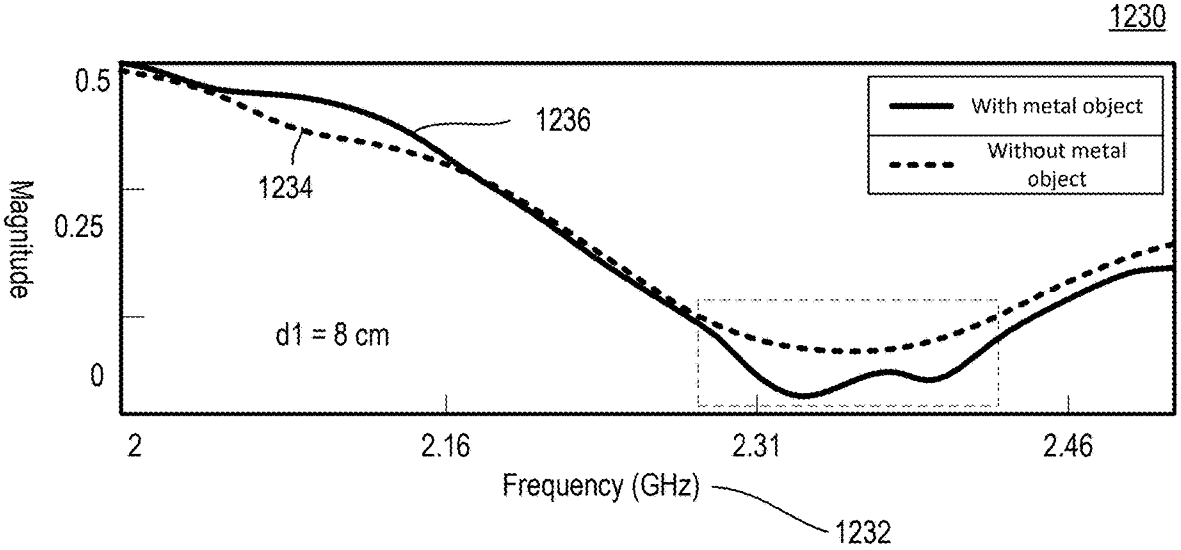
FIG. 12B is a plot that illustrates the magnitude of the reflection scattering parameter S11 of a directional antenna placed at 8 cm above the surface of the ground, in accordance with at least one example.

FIG. 12B is a plot 1230 that shows the normalized magnitude of the reflection scattering parameter S11 of directional antenna 300 over a frequency range 1232 of 2 GHz to 2.5 GHz, in accordance with at least one example. Curve 1234 represents the normalized magnitude of the normalized reflection scattering parameter S11 when no metal object is present within the field of directional antenna 300; and curve 1236 represents the magnitude of the normalized reflection scattering parameter when a buried metal object is present within the field of directional antenna 300 at a distance D1 1122 of 8 cm and D2 1124 of 4 cm. Plot 1230 shows that curve 1234 exhibits a smooth dip at a frequency of 2.35 GHz. In comparison, curve 1236 exhibits irregular changes in the normalized magnitude of the reflection scattering parameter S11 at a frequency of 2.35 GHz because of the presence of a buried metal object within the field of directional antenna 300.

Figure 12C:
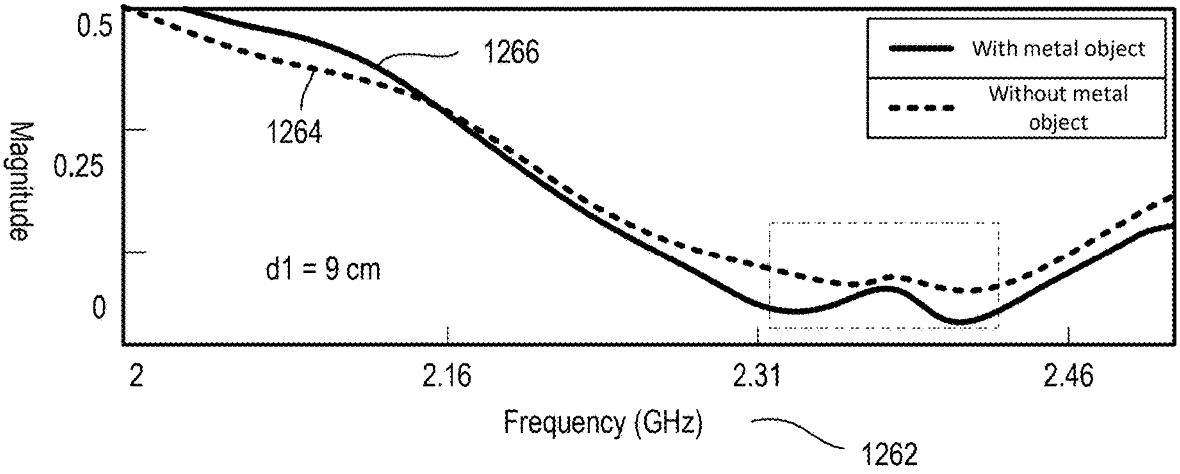
FIG. 12C is a plot that illustrates the magnitude of the reflection scattering parameter S11 of a directional antenna placed at 9 cm above the surface of the ground, in accordance with at least one example.

FIG. 12C is a plot 1260 that shows the normalized magnitude of the reflection scattering parameter S11 of directional antenna 300 over a frequency range 1262 of 2 GHz to 2.5 GHZ, in accordance with at least one example. Curve 1264 represents the normalized magnitude of the normalized reflection scattering parameter S11 when no metal object is present within the field of directional antenna 300; and curve 1266 represents the magnitude of the normalized reflection scattering parameter when a buried metal object is present within the field of directional antenna 300 at a distance D1 1122 of 9 cm and D2 1124 of 4 cm. Plot 1260 shows that curve 1264 only exhibits a negligible irregularity pattern in the normalized magnitude of the reflection scattering parameter S11 at a frequency of 2.35 GHz. In comparison, curve 1266 exhibits irregular changes in the normalized magnitude of the reflection scattering parameter S11 at a frequency of 2.35 GHz because of presence of a buried metal object within the field of directional antenna 300.

Figure 12D:
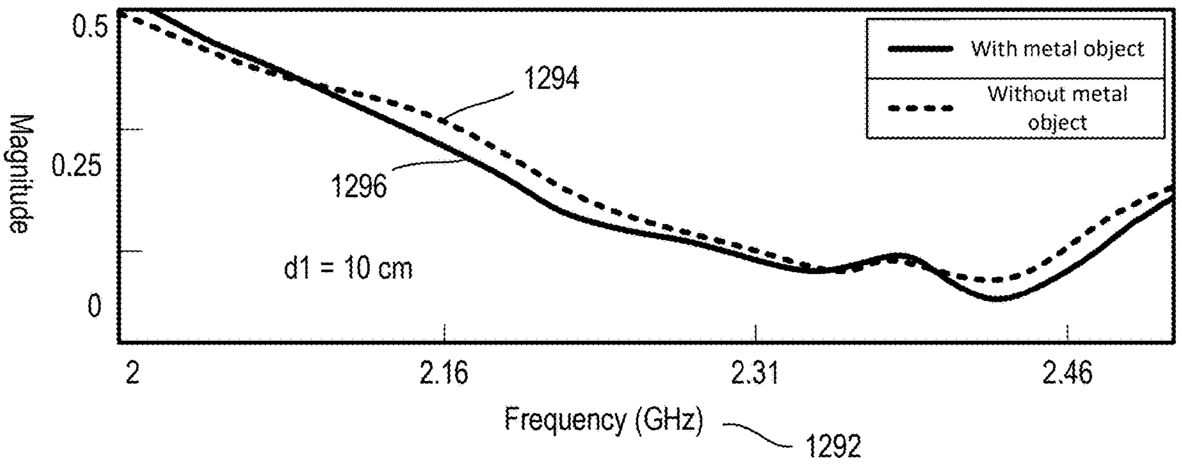
FIG. 12D is a plot that illustrates the magnitude of the reflection scattering parameter S11 of directional antenna placed at 10 cm above the surface of the ground, in accordance with at least one example.

FIG. 12D is a plot 1290 that shows the normalized magnitude of the reflection scattering parameter S11 of directional antenna 300 over a frequency range 1292 of 2 GHz to 2.5 GHZ, in accordance with at least one example. Curve 1294 represents the normalized magnitude of the normalized reflection scattering parameter S11 when no metal object is present within the field of directional antenna 300; and curve 1296 represents the magnitude of the normalized reflection scattering parameter when a buried metal object is present within the field of directional antenna 300 at a distance D1 1122 of 10 cm and D2 1124 of 4 cm. Plot 1290 shows that curve 1294 exhibits significant irregular changes in the normalized magnitude of the reflection scattering parameter S11 at a frequency of 2.35 GHz. In comparison, curve 1296 exhibits irregular changes in the normalized magnitude of the reflection scattering parameter S11 at a frequency of 2.35 GHz because of presence of a buried metal object within the field of directional antenna 300. In this case, equation (3) is not satisfied as well.

Figure 13A:
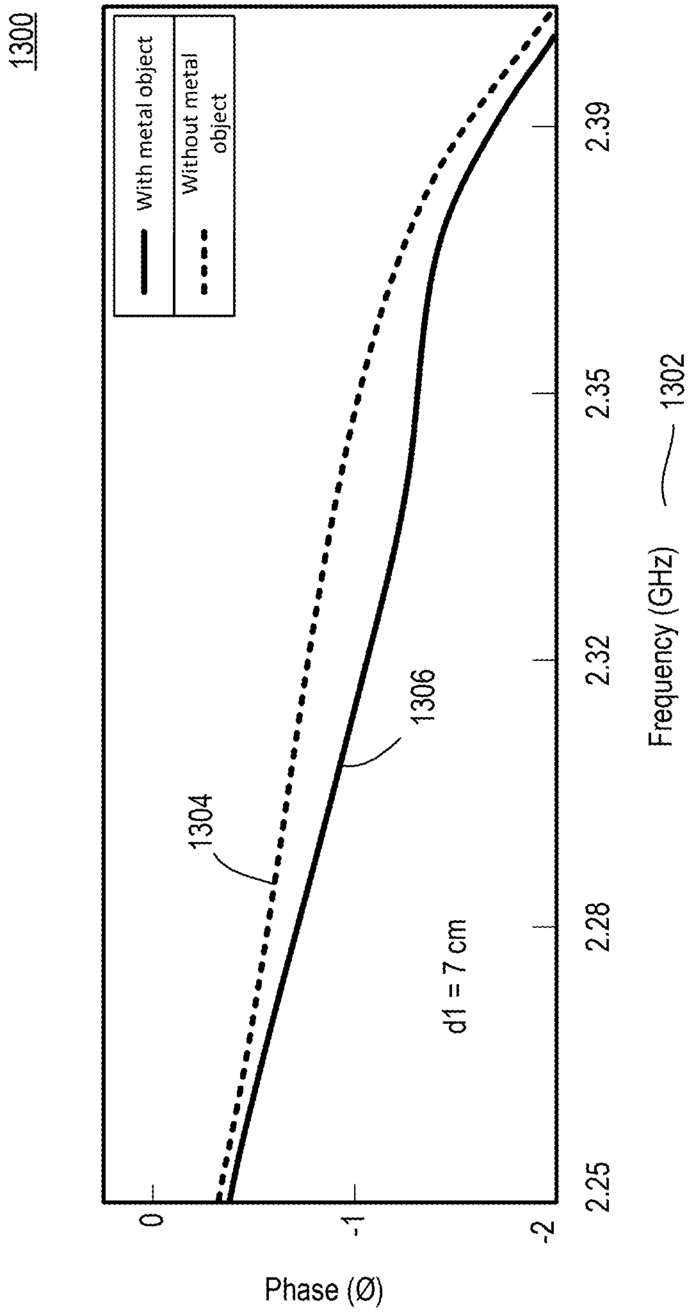
FIG. 13A is a plot that illustrates the phase of the reflection scattering parameter S11 of a directional antenna placed at 7 cm above the surface of the ground, in accordance with at least one example.

FIG. 13A is a plot 1300 that shows the normalized phase of the reflection scattering parameter S11 of directional antenna 300 over a frequency range 1302 of 2 GHz to 2.5 GHZ, in accordance with at least one example. Curve 1304 represents the normalized phase of the reflection scattering parameter S11 of directional antenna 300 when no metal object is present within the field of a directional antenna 300; and curve 1306 represents the normalized phase of the reflection scattering parameter S11 of directional antenna 300, when a buried metal object is present within the field of directional antenna 300 at a distance D1 1122 of 7 cm and D2 1124 of 4 cm. Plot 1300 show that curve 1306 follows the same response in the variations of the normalized phase as that of curve 1304; therefore, in this example scenario it is not possible to detect a buried metal object present within the field of directional antenna 300.

Figure 13B:
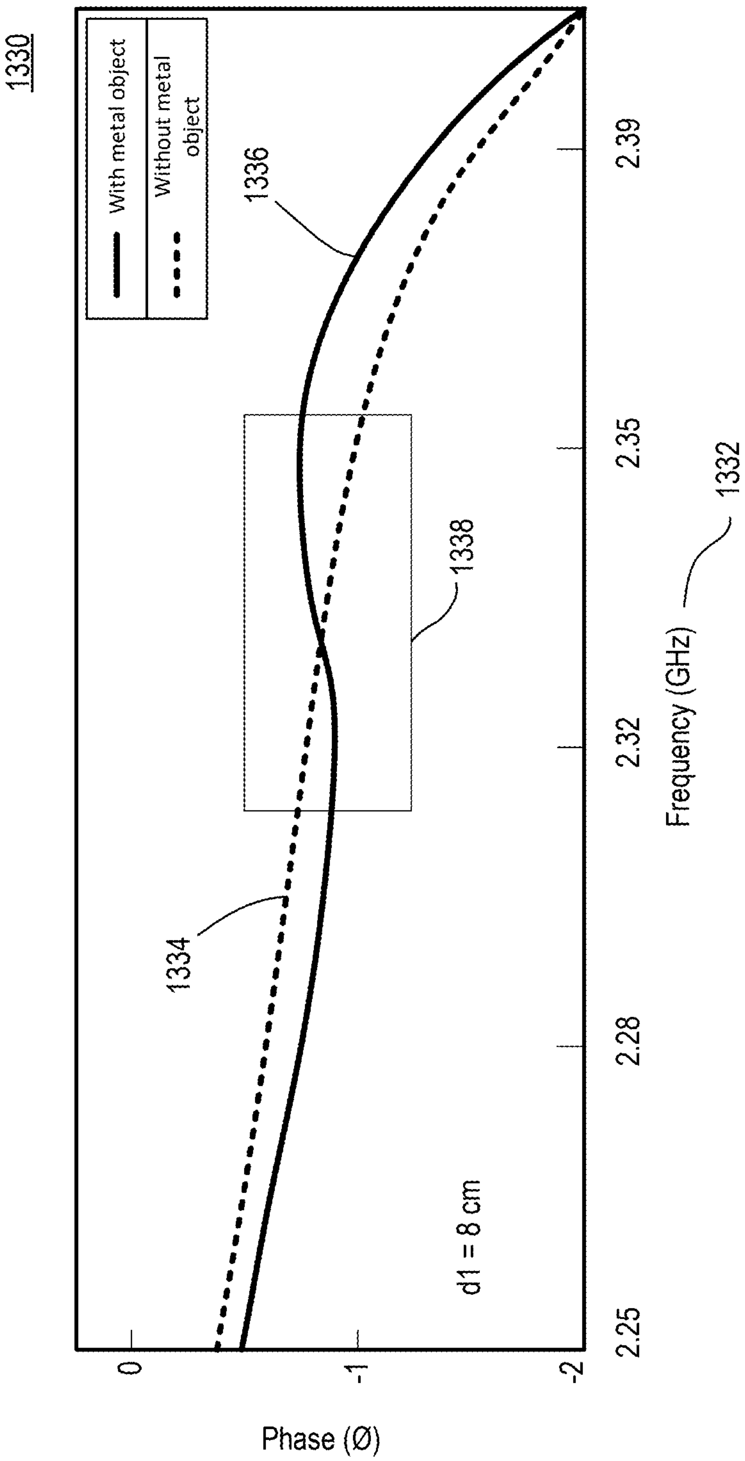
FIG. 13B is a plot that illustrates the phase of the reflection scattering parameter S11 of a directional antenna placed at 8 cm above the surface of the ground, in accordance with at least one example.

FIG. 13B is a plot 1330 that shows the normalized phase of the reflection scattering parameter S11 of directional antenna 300 over a frequency range 1332 of 2 GHz to 2.5 GHZ, in accordance with at least one example. Curve 1334 represents the normalized phase of the reflection scattering parameter S11 of directional antenna 300 when no metal object is present within the field of directional antenna 300; and curve 1336 represents the normalized phase of the reflection scattering parameter S11 of directional antenna 300, when a buried metal object is present within the field of directional antenna 300 at a distance D1 1122 of 8 cm and D2 1124 of 4 cm. Plot 1330 shows that curve 1336 exhibits a unique and distinct anomalous phase response 1338 because of presence of a buried metal object within the field of directional antenna 300.

Figure 13C:
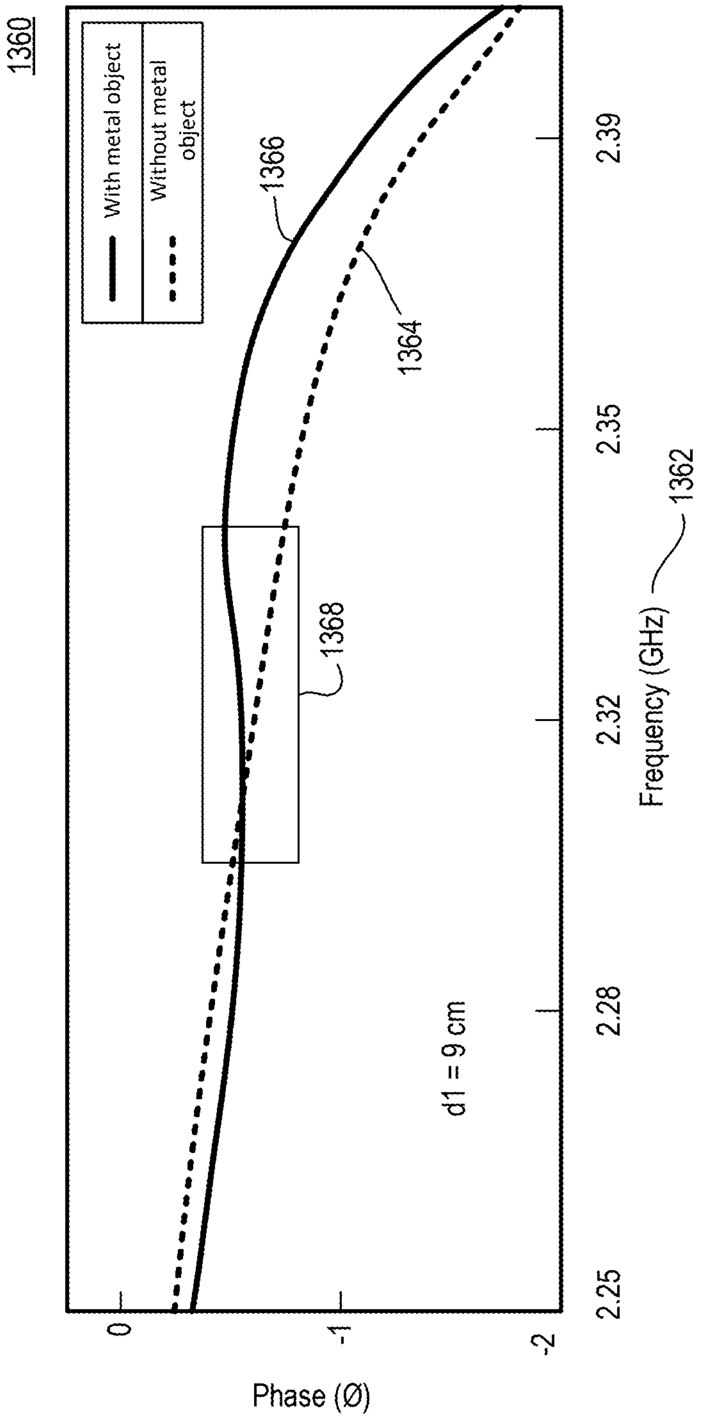
FIG. 13C is a plot that illustrates the phase of the reflection scattering parameter S11 of a directional antenna placed at 9 cm above the surface of the ground, in accordance with at least one example.

FIG. 13C is a plot 1360 that shows the normalized phase of the reflection scattering parameter S11 of directional antenna 300 over a frequency range 1362 of 2 GHz to 2.5 GHZ, in accordance with at least one example. Curve 1364 represents the normalized phase of the reflection scattering parameter S11 of directional antenna 300 when no metal object is present within the field of directional antenna 300; and curve 1366 represents the normalized phase of the reflection scattering parameter S11 of directional antenna 300, when a buried metal object is present within the field of directional antenna 300 at a distance D1 1122 of 9 cm and D2 1124 of 4 cm. Plot 1360 shows that curve 1366 exhibits a unique and distinct anomalous phase response 1368 because of presence of a buried metal object within the field of directional antenna 300. However, the slope of anomalous phase response 1368 is less steep when compared to anomalous phase response 1338 of FIG. 13B.

Figure 13D:
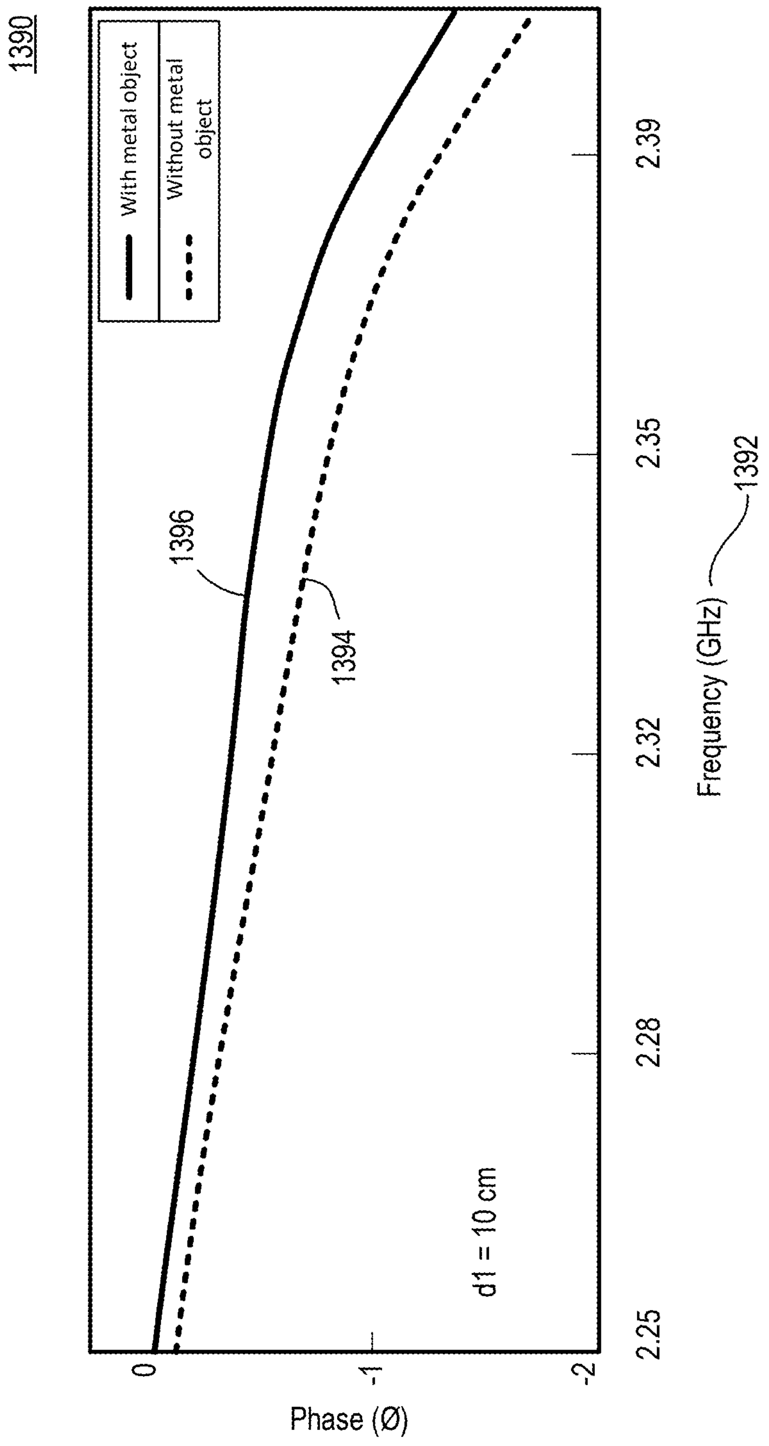
FIG. 13D is a plot that illustrates the phase of the reflection scattering parameter S11 of a directional antenna placed at 10 cm above the surface of the ground, in accordance with at least one example.

FIG. 13D is a plot 1390 that shows the normalized phase of the reflection scattering parameter S11 of directional antenna 300 over a frequency range 1392 of 2 GHz to 2.5 GHZ, in accordance with at least one example. Curve 1394 represents the normalized phase of the reflection scattering parameter S11 of directional antenna 300 when no metal object is present within the field of directional antenna 300; and curve 1396 represents the normalized phase of the reflection scattering parameter S11 of directional antenna 300, when a buried metal object is present within the field of directional antenna 300 at a distance D1 1122 of 10 cm and D2 1124 of 4 cm. Plot 1360 shows that curve 1396 and curve 1394 exhibits the same variations pattern in the normalized phase of the reflection scattering parameter S11 of directional antenna 300. Therefore, in this case it may not be possible to reliably detect a buried metal object within the field of directional antenna 300. Curve 1396 does not satisfy equation (3).

Curves 1304, 1334, 1364, and 1394 show a consistent behavior for the normalized phase of the reflection scattering parameter S11 of directional antenna 300 in plots 1300, 1330, 1360, and 1390, when a metal object is not buried within the field of directional antenna 300. In comparison, the normalized phase of the reflection scattering parameter S11 of directional antenna 300 varies differently, yet distinctly, when a metal object is buried within the field of directional antenna 300 at a particular distance. The normalized phase of the reflection scattering parameter S11 of directional antenna 300 shows minor variations in phase plots 1300 and 1390 when directional antenna 300 is placed at distances D1 1122 of 7 and 10 cm, respectively. Once a metal object is buried at distances D1 1122 of 8 cm and 9 cm, phase curves 1336 and 1396 of the normalized phase of the reflection scattering parameter S11 of directional antenna 300 show significant variations in the anomalous phase variations in frequency bands marked by boxes of anomalous phase responses 1338 and 1368, respectively. Moreover, variations in the normalized phase of the reflection scattering parameter S11 of directional antenna 300 are highly sensitive to the distance at which directional antenna 300 is placed above the surface of the ground, and anomalous phase response only appears once the distance values satisfy constraints mentioned of equation (3). The variations in the normalized phase of the reflection scattering parameter S11 of directional antenna 300 are also less prone to noise signals, and hence provide a relatively reliable and accurate detection method for buried metal objects compared with that of analyzing the normalized magnitude of the reflection scattering parameter S11 of directional antenna 300.

Figure 14:
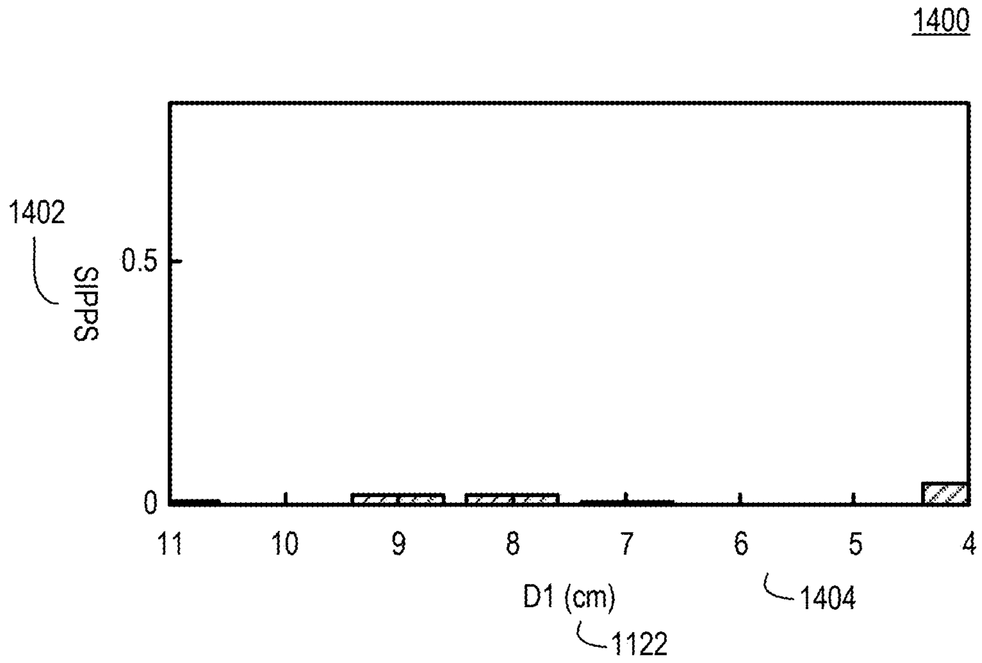
FIG. 14 is a histogram of the spectrally integrated positive phase slope (SIPPS) as a function of the distance above the surface of the ground at which a directional antenna is placed when no metal is buried, in accordance with at least one example.

FIG. 14 is a histogram plot 1400 of the spectrally integrated positive phase slope (SIPPS) as a function of distance when no metal object is buried below the surface of the ground, in accordance with at least one example. The vertical axis of histogram plot 1400 represents SIPPS values 1402, while the horizontal axis 1404 represents distance D1 1122 in centimeters, starting from 11 cm and gradually decreasing it to 4 cm in a graduation of 1 cm. The height of bars is approximately zero for all distances which indicates that anomalous variations in the normalized phase do not occur when a metal object is not buried within the field of antenna 300.

Figure 15:
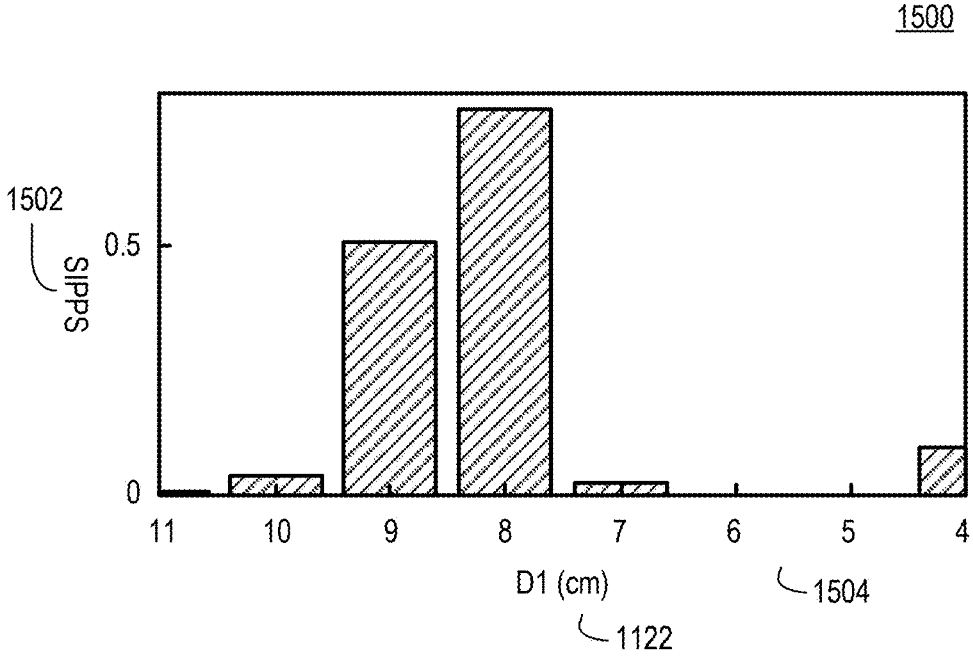
FIG. 15 is a histogram of the spectrally integrated positive phase slope (SIPPS) as a function of the distance above the surface of the ground at which a directional antenna is placed when a metal object is buried, in accordance with at least one example.

FIG. 15 is a histogram plot 1500 of the spectrally integrated positive phase slope (SIPPS) as a function of distance D1 1122, in accordance with at least one example. The vertical axis of histogram plot 1500 represents SIPPS values 1502, while the horizontal axis 1504 represents distance D1 1122 in centimeters, starting from 11 cm, and gradually decreasing it to 4 cm in a graduation of 1 cm. Histogram plot 1500 shows a distribution of SIPPS values 1502 at varying distances. The distribution of SIPPS values 1502 values is relatively very high when a metal object is buried at distances of 9 cm and 8 cm, showing anomalous phase behavior observed in the normalized phase of reflection scattering parameter S11 of directional antenna 300. A metal object in this case is buried at D2 1124 of 4 cm and equation (3) is satisfied for directional antenna 300 if D1 1122 is 8 cm, which is the distance at which SIPPS value is also the largest. For other distances, SIPPS values are relatively small and hence no anomalous phase changes are observed in the normalized phase of reflection scattering parameter S11 of directional antenna 300. A higher positive slope gradient of an anomalous phase results in a higher SIPPS value, and the higher SIPPS value is a determinant to confirm the presence of a buried metal object.

Figure 16:
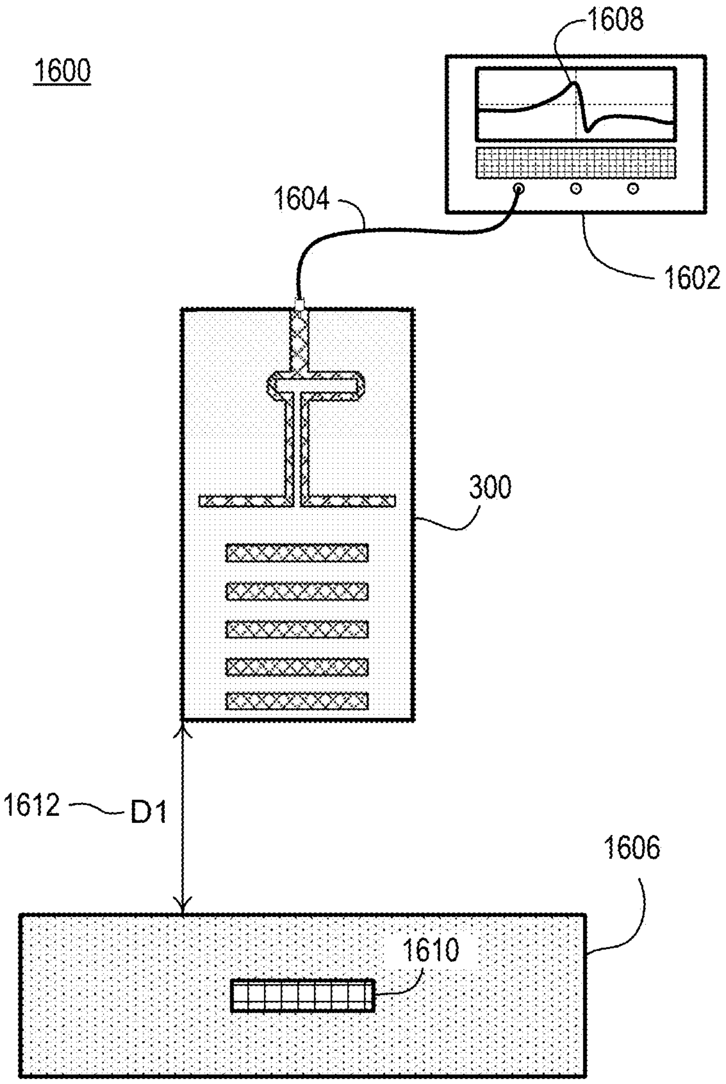
FIG. 16 is schematic that illustrates an example apparatus that can detect metals using a directional antenna, in accordance with at least one example.

FIG. 16 is schematic that illustrates an example apparatus 1600 detecting metals using directional antenna 300, in accordance with at least one example. Analyzer 1602 supplies RF signals to antenna 300 via a transmission line 1604. Directional antenna 300 is scanned vertically over ground 1606 until an anomalous phase response 1608 is observed on analyzer 1602. The presence of metal object 1610 creates a significant impact on the normalized phase of reflection scattering parameter S11 of antenna 300. For determining the specific distance at which a metal object 1610 is buried, distance D1 1612 is recorded where a maximum positive slope of anomalous phase response 1608 is observed. The distance at which metal object 1610 is buried can be calculated using equation (3) or (4). In at least one example, analyzer 1602 may be a vector network analyzer, a phase analyzer, a SIPPS analyzer, a phase slope analyzer or any other phase processing equipment.

Figure 17:
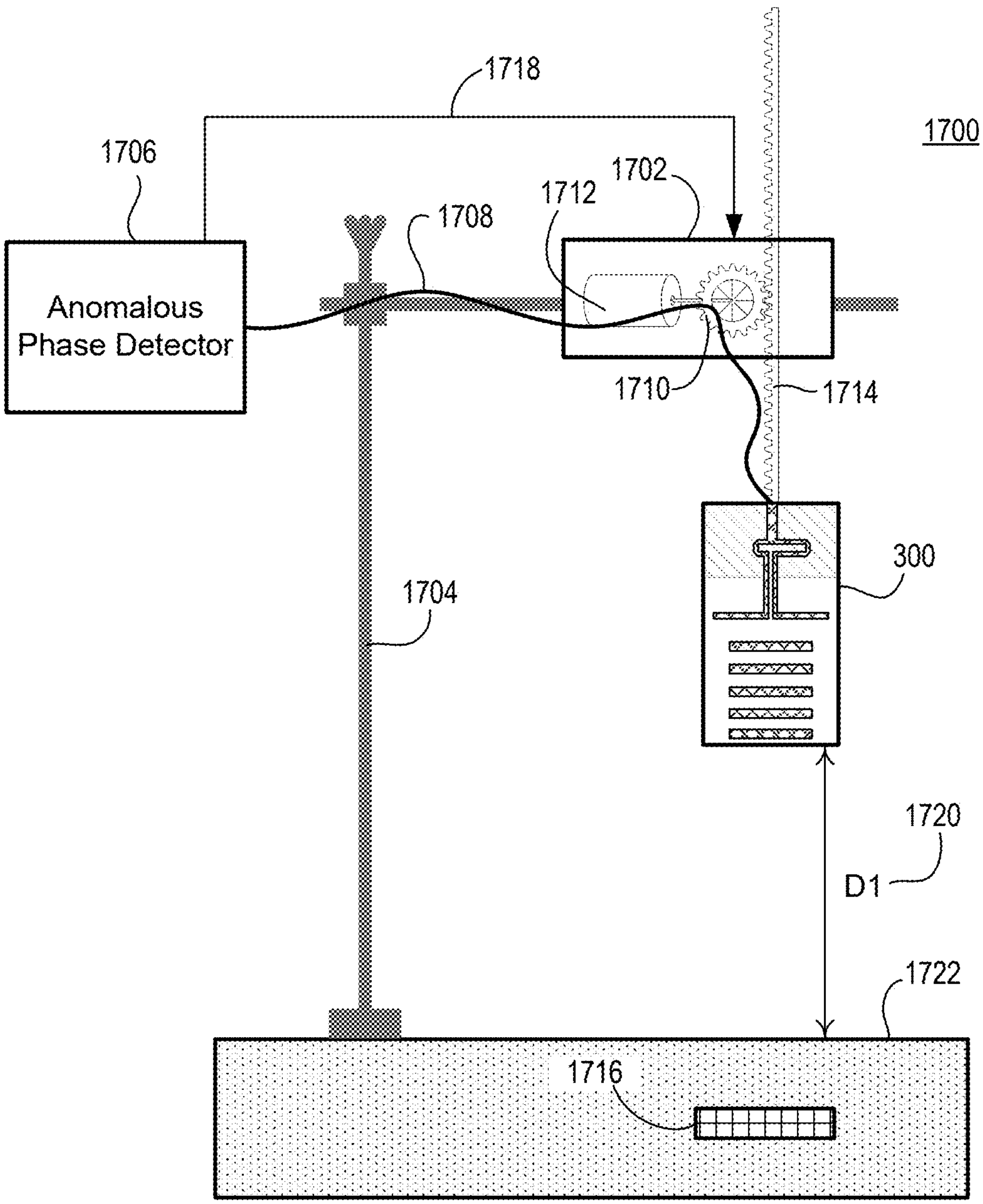
FIG. 17 is a schematic that illustrates another example apparatus of a metal detecting ground penetrating radar with a motorized system, in accordance with at least one example.

FIG. 17 is a schematic that illustrates another example apparatus 1700 of a metal detecting ground penetrating radar with a motorized system 1702, in accordance with at least one example. Directional antenna 300 and motorized system 1702 are mounted on a vertical support structure 1704 and directional antenna 300 is connected to anomalous phase detector 1706 via a transmission line 1708. Motorized system 1702 includes a pinion gear 1710, driven by an electric motor 1712, which engages with a linear rack 1714. Motorized system 1702 is used to adjust the position of directional antenna 300, enabling precise movement of directional antenna 300 during vertical scanning, leading to detection of metal object 1716.

In at least one example, as directional antenna 300 exhibits its anomalous phase response at specific distances, feedback loop 1718 from phase detector 1706 is used to adjust height D1 1720 of directional antenna 300 from ground 1722. Buried metal object 1716 is positioned below the surface of ground 1722 at an unknown distance. Motorized system 1702 continuously adjusts height D1 1720 to identify a specific distance at which anomalous phase response occurs. Anomalous phase detector 1706, connected to directional antenna 300, monitors the normalized phase of reflection scattering parameter S11 of antenna 300, and provides real time data to motorized system 1702, allowing motorized system 1702 to automatically adjust directional antenna 300 at a distance D1 where anomalous phase response can be detected. Once adjusted, distance D1 1720 and equations (3) or (4) can be used to estimate the depth below the surface of the ground 1722 at which a metal object is buried.

Figure 18:
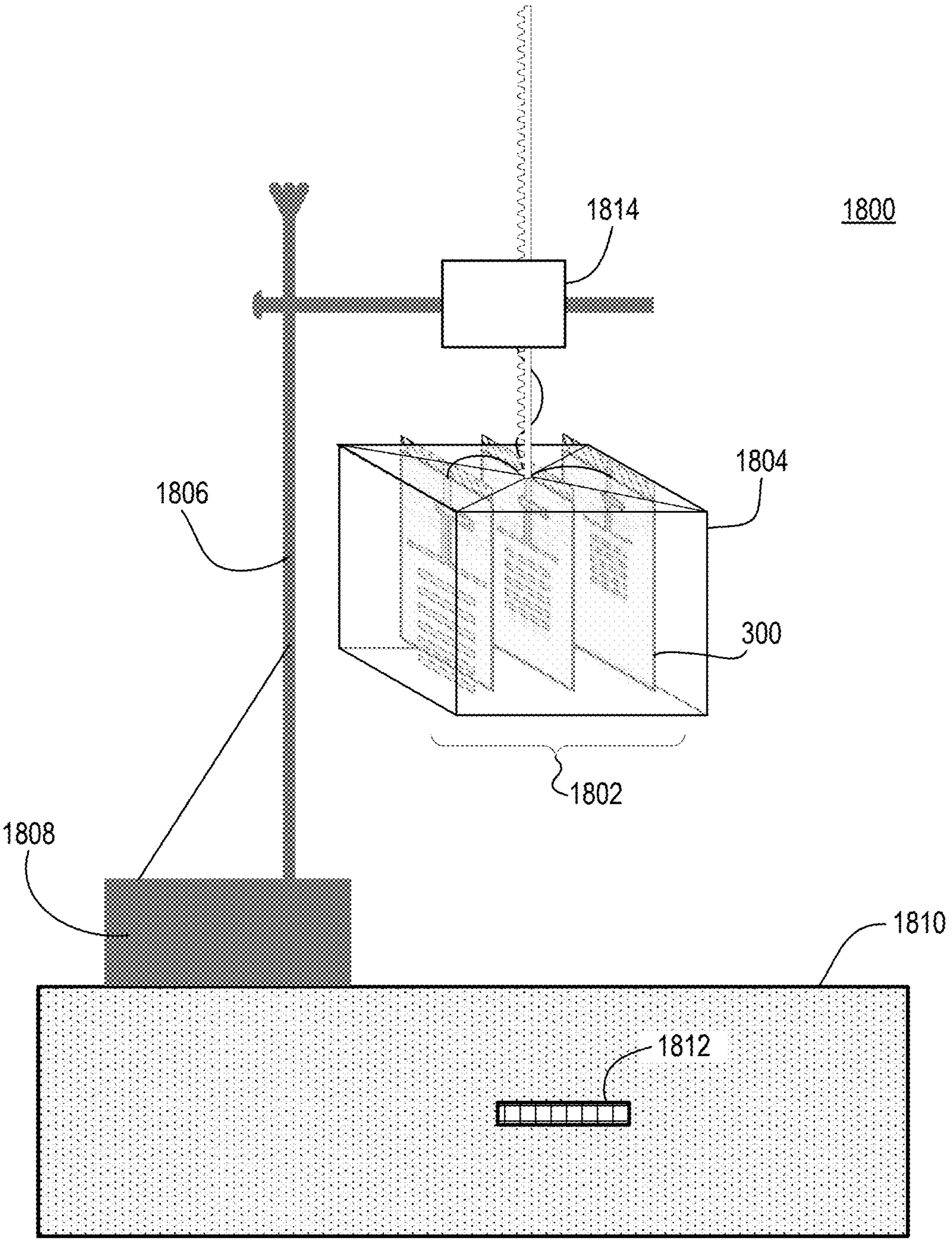
FIG. 18 is a schematic of an example apparatus for detecting metals using anomalous phase detection in one or more antennas, in accordance with at least one example.

FIG. 18 is a schematic of an example apparatus 1800 for detecting metal objects, using anomalous phase response, in the presence of one or more antennas, in accordance with at least one example. Apparatus 1800 comprises a stack 1802 of directional antennas 300 housed in a shielded casing 1804 that is mounted on a support structure 1806. Each antenna in a stack 1802 of directional antennas 300 is positioned at the same height but designed to respond to different harmonics. Apparatus 1800 reduces the number of vertical movements or manual adjustments in distance, as each directional antenna 300 in stack 1802 can detect anomalous variations in the normalized phase corresponding to the reflection scattering parameter S11 of antenna 300 in stack 1802. Support structure 1806 is mounted on a base 1808. In at least one example, base 1808 may be mobile and is moved using an integrated wheel and a control system, enabling apparatus 1800 to autonomously scan a surface area of the field 1810 for a buried metal object 1812.

In at least one example, presence of metal object 1812 affects the normalized phase of reflection scattering parameter S11 in stack 1802. Each antenna in stack 1802 is connected to an anomalous phase detector in control box 1814, which monitors changes in the normalized phase of reflection scattering parameters S11 corresponding to an antenna 300 in stack 1802 across different distance ranges. Control box 1814 can collect data from each antenna in stack 1802 and perform a comprehensive analysis of variations in the normalized phase of reflection scattering parameters of each antenna in stack 1802 at various ranges. Example apparatus 1800 is useful in scenarios, where a rapid deployment with little or no manual intervention is desired, such as detecting mines that laid in a field. By utilizing a stack 1802 of antennas with different ranges, apparatus 1800 enables not only accurate and reliable detection of buried metal objects but also reduces the complexity of apparatus and its setup time.

Figure 19:
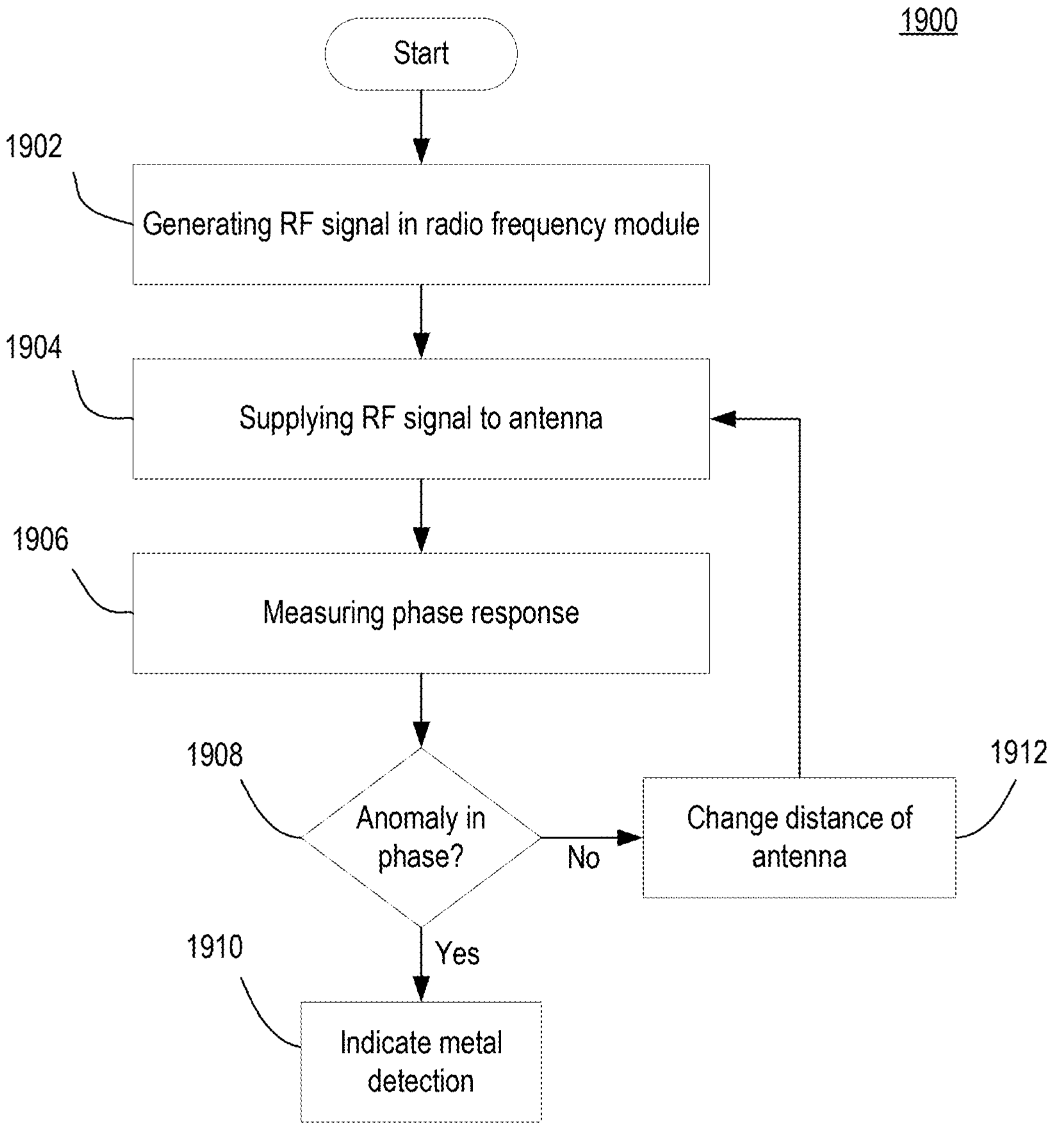
FIG. 19 is a flow graph of an anomalous phase detection method that can be used in ground penetrating radar to detect buried metal objects, in accordance with at least one example.

FIG. 19 is a flow graph of an anomalous phase detection method 1900 used in a ground penetrating radar to detect buried metal objects, in accordance with at least one example. Method 1900 begins at box 1902, where a radio frequency module generates an RF signal. The RF signal is then fed to directional antenna 300 in box 1904. Directional antenna 300 transmits the RF signal in its ambient environment that eventually reaches a metal object, buried below the surface of the ground, and is reflected by the metal object. Once the reflected signal is received at directional antenna 300 of the ground penetrating radar, the normalized phase response is measured at box 1906. A buried metal object below the surface of the ground significantly changes the phase of RF, resulting in anomalous phase response. At box 1908, if an anomalous behavior in the phase response of reflected signal is found, then this confirms the presence of a buried metal object, and the detection of metal object is indicated at box 1910. If an anomalous phase response is not found, the process restarts at box 1904 after the vertical distance of an antenna is changed at box 1912.

Throughout specification, and in claims, "connected" may generally refer to a direct connection, such as electrical, mechanical, or magnetic connection between things that are connected, without any intermediary devices.

Here, "quasi" may generally refer to something that is seemingly or almost but not completely and more particularly to a state or condition that approximates a true or ideal state, such as—static fields which are not purely static but behave similarly to static fields under certain conditions.

Here, "ground penetrating radar" may generally refer to a radar apparatus that uses radar pulses to image the subsurface and more particularly to a technique that detects buried objects, changes in material properties, and voids and cracks beneath the surface by transmitting electromagnetic waves and receiving the reflected signals.

Here, "metal detecting ground penetrating radar" may generally refer to a type of radar apparatus that is used to locate and identify metal objects buried below the surface of the ground.

Here, "buried metal object" may generally refer to any metal object that is located buried below the surface of the ground and can be detected using specialized equipment such as metal detectors or ground penetrating radars.

Here, "balun" may generally refer to a type of electrical device that converts between balanced and unbalanced signals and more particularly to a component used in antenna system to connect a balanced transmission line to an unbalanced device, thereby ensuring efficient signal transfer and reducing interference.

Here, "anomalous phase" may generally refer to an irregularity or anomaly in the phase of a signal or wave and more particularly to a phenomenon observed in object detection using antenna systems, where the phase of the received signal deviates significantly from the expected or normal phase, often indicating the presence of an object buried below the surface of the ground.

Here, "anomalous phase detector" may generally refer to a component or device designed to detect anomalous phase behavior by identifying and analyzing anomalous phase shifts in received signals at one or more antennas of a radar.

Here, "double slope shift" or "dual slope shift" may generally refer to a phenomenon characterized by two distinct changes in the slope of a signal or waveform, and more particularly to a pattern observed in metal object detection using antennas, where the phase of the received signal exhibits two noticeable shifts in the slope of a signal or waveform.

Here, "antenna" may generally refer to a device used to transmit or receive electromagnetic signals and more particularly to a component of a metal object detection system that emits and receives radio frequency signals to detect metal objects buried below the surface of the ground.

Here, "phase response" may generally refer to a relationship between the phase of a particular signal and the frequency of the particular signal, and more particularly to the behavior of an antenna affecting phase of received signals across a range of different frequencies.

Here, "Yagi-Uda" may generally refer to a type of directional antenna commonly used in radio communication and more particularly to an antenna design consisting of a driven element, reflector, and one or more directors arranged in a specific configuration to achieve directional characteristics, typically used in metal object detection apparatus, and emit and receive electromagnetic radiation for detecting buried objects with improved sensitivity and directional control.

Here, "driven element" may generally refer to the main radiating element of an antenna that is directly connected to a feedline or transmitter and more particularly to the dipole of a directional antenna that actively transmits or receives electromagnetic signals.

Here, "director elements" may generally refer to additional parasitic elements in an antenna array, positioned in front of a driven element, and more particularly to components of a directional antenna that are placed to the front of the driven element to focus and direct the radiation pattern towards a target area, enhancing the directional characteristics and sensitivity of antenna for detecting metal objects.

Here, "dipole" may generally refer to two conductive elements, typically aligned in parallel and separated by a small gap, and more particularly to a fundamental antenna design used in various radio communication applications, including metal object detection systems.

Here, "dispersion characteristics" may generally refer to the behavior of a system or medium in terms of how it affects the propagation of signals, particularly with respect to how different frequencies of a signal travel through the medium, and more particularly to the properties exhibited by a material or medium that cause signals of varying frequencies to travel at different speeds or with different phase shifts.

Here, "normal reflection" may generally refer to a phenomenon where an electromagnetic wave encounters a boundary between two mediums at a perpendicular angle and undergoes dispersion-less reflection back to the original medium.

Here, "conventional dispersion" may generally refer to a predictable behavior exhibited by a material or medium in terms of how it affects the propagation of signals, particularly with respect to how different frequencies of a signal travel through the material or medium, and more particularly to a typical or expected dispersion characteristics observed in a given material or medium operating under standard conditions.

Here, "anomalous dispersion" may generally refer to a deviation from an expected behavior of a material or medium in terms of how it affects the propagation of signals and more particularly to a phenomenon where the phase of signals at certain frequencies differs significantly from an expected normal behavior.

Here, "resonant medium" may generally refer to a material or medium that exhibits resonance behavior when subjected to electromagnetic radiation, and more particularly to a substance with electromagnetic properties aligned with the frequency of incident electromagnetic waves, causing increased absorption, reflection, or transmission of the electromagnetic radiation.

Here, "reflection scattering parameter" may generally refer to a measure of the ratio of the amplitude of a reflected wave to the amplitude of an incident wave when an electromagnetic wave encounters a boundary between two different mediums, and more particularly to a parameter used to quantify the fraction of energy reflected from the interface between two materials.

Here, "RF module" may generally refer to a compact electronic device or circuit configured to manage radio frequency signals and more particularly configured to generate RF signals and supply these signals to an antenna.

Here, "radiation pattern" may generally refer to a graphical representation or description of a distribution of electromagnetic energy emitted or received by an antenna in different directions.

Here, "primary lobe" may generally refer to a main or central region of the radiation pattern of an antenna, where the majority of the electromagnetic energy is concentrated and directed, and more particularly to a dominant and typically strongest lobe in the radiation pattern.

Here, "near-field" may generally refer to a region close to an antenna where the electromagnetic field is dominant and exhibits complex behavior distinct from a far field of an antenna, and more particularly to an area immediately surrounding the antenna where the electric and magnetic fields interact directly with nearby objects, surfaces, or materials.

Here, "phase recorder" may generally refer to a device or system designed to capture and record changes in the phase of signals over time, and more particularly to a specialized recorder used in a metal object detection apparatus with antenna arrays to store variations in the phase of received signals as an antenna of a radar scans or surveys an area.

Here, "slope evaluator" may generally refer to a component or algorithm within a metal detection system that assesses a rate of change or slope of a phase response that is recorded by a phase recorder.

Here, "spectrally integrated positive phase slope" may generally refer to a superposition of the positive phase slopes over different distances at which antenna is scanned.

Here, "zero crossings" may generally refer to points in a signal where its value changes from positive to negative or vice versa and passes through zero on x-axis.

Here, "analyzer" may generally refer to a device or software tool used to examine, interpret, or process data or signals to extract useful information or insights, and more particularly to a component or system integrated into metal object detection apparatus to analyze the characteristics, properties, or behavior of electromagnetic signals received at an antenna of a radar.

Here, "transmission line" may generally refer to a structure or medium used by electromagnetic signals to travel from one point to another with minimal loss or distortion.

Here, "motorized system" may generally refer to a mechanism or setup that incorporates motors or motor-driven components to automate or facilitate various tasks or operations, and more particularly to an apparatus equipped with motors to enable controlled movement, adjustment, or positioning of antenna(s) for vertical scanning during metal object detection.

Here, "rack and pinion" may generally refer to a mechanical system used for converting rotational motion into linear motion or vice versa, and more particularly to a gear mechanism consisting of a toothed rack (a linear gear) and a pinion gear (a circular gear), where the rotation of a pinion gear drives the linear movement of a toothed rack.

Here, "coupled" may generally refer to a direct or indirect connection, such as a direct electrical, mechanical, or magnetic connection between things that are connected or an indirect connection, through one or more passive or active intermediary devices.

Here, "module" may generally refer to one or more passive and/or active components that are arranged to cooperate with one another to provide a desired function.

Here, "signal" may generally refer to at least one current signal, voltage signal, magnetic signal, or data/clock signal. Here, meaning of "a," "an," and "the" include plural references. Here, the meaning of "in" includes "in" and "on".

Here, terms "substantially," "close," "approximately," "near," and "about," generally refer to being within +/−10% of a target value. For example, unless otherwise specified in explicit context of their use, terms "substantially equal," "about equal" and "approximately equal" mean that there is no more than incidental variation between among things so described. In at least one example, such variation is typically no more than +/−10% of a predetermined target value.

Unless otherwise specified use of ordinal adjectives "first," "second," and "third," etc., to describe a common object, merely indicate that different instances of like objects are being referred to and are not intended to imply that objects so described must be in a given sequence, either temporally, spatially, in ranking or in any other manner.

Here, "top," "bottom," "over," "under," and "on" as used herein refer to a relative position of one component, structure, or material with respect to other referenced components, structures or materials within a device, where such physical relationships are noteworthy. In at least one example, these terms are employed herein for descriptive purposes only and predominantly within context of a device z-axis and therefore may be relative to an orientation of a device. In at least one example, a first material "over" a second material in context of a figure provided herein may also be "under" second material if device is oriented upside-down relative to context of figure provided. In context of materials, one material disposed over or under another may be directly in contact or may have one or more intervening materials. Moreover, one material disposed between two materials may be directly in contact with two layers or may have one or more intervening layers. In at least one example, a first material "on" a second material is in direct contact with that second material. Similar distinctions are to be made in context of component assemblies.

Here, "between" may be employed in context of z-axis, x-axis, or y-axis of a device. In at least one example, a material that is between two other materials may be in contact with one or both of those materials or may be separated from both of other two materials by one or more intervening materials. In at least one example, a material "between" two other materials may therefore be in contact with either of other two materials or may be coupled to other two materials through an intervening material. In at least one example, a device that is between two other devices may be directly connected to one or both of those devices or may be separated from both of other two devices by one or more intervening devices.

Reference in specification to "an example," "one example," "in at least one example," "some examples," or "other examples" means that a particular feature, structure, or characteristic described in connection with examples is included in at least some examples, but not necessarily all examples. Various appearances of "an example," "one example," "in at least one example," or "some examples" are not necessarily all referring to same examples. If specification states a component, feature, structure, or characteristic "may," "might," or "could" be included, that particular component, feature, structure, or characteristic is not required to be included. If specification or claim refers to "a" or "an" element, that does not mean there is only one of elements. If specification or claims refer to "an additional" element, that does not preclude there being more than one of additional elements.

Furthermore, particular features, structures, functions, or characteristics may be combined in any suitable manner in one or more examples. For example, a first example may be combined with a second example anywhere particular features, structures, functions, or characteristics associated with two examples are not mutually exclusive.

While at least one example has been described in conjunction with specific examples thereof, many alternatives, modifications, and variations of such examples will be apparent to those of ordinary skill in the art considering description herein. At least one example is intended to embrace all such alternatives, modifications, and variations as to fall within broad scope of appended claims.

In addition, arrangements may be shown in block diagram form to avoid obscuring any example, and in view of the fact that specifics with respect to implementation of such block diagram arrangements are highly dependent upon the platform within which an example is to be implemented (e.g., such specifics should be well within purview of one skilled in art). Where specific details (e.g., circuits) are set forth to describe example embodiments of disclosure, it should be apparent to one skilled in art that disclosure can be practiced without, or with variation of, these specific details. Description of an example is thus to be regarded as illustrative instead of limiting.

In at least one example, structures described herein can also be described as method(s) of forming those structures or apparatuses, and method(s) of operation of these structures or apparatuses. Following examples are provided that illustrate at least one example. An example can be combined with any other example. As such, at least one example can be combined with at least another example without changing scope of an example.

Example 1 is a method of metal detection using a ground penetrating radar, the method comprising: generating a radio frequency signal by a radio frequency module; supplying the radio frequency signal to one or more directional antennas of the ground penetrating radar; scanning the one or more directional antennas over an area of a surface after transmitting the radio frequency signal, wherein the transmitted radio signal enters a subsurface of the area of a surface, wherein the subsurface of the area of a surface area contains one or more concealed metal objects, and wherein the one or more concealed metal objects reflects a radio frequency signal; receiving a reflected radio frequency signal from the one or more directional antennas; measuring an anomalous phase distortion in the reflected radio frequency signal received from the one or more directional antennas using an anomalous phase detector; and detecting a concealed metal object if the anomalous phase distortion is observed in the reflected radio frequency signal received from the one or more directional antennas.

Example 2 is a method according to any examples herein, in particular example 1, wherein the one or more directional antennas are scanned using a motorized system, wherein the motorized system displaces the one or more directional antennas vertically or horizontally over an area of a surface containing one or more concealed metal objects.

Example 3 is a method according to any examples herein, in particular example 1, wherein an individual directional antenna of the one or more directional antennas includes: one or more baluns, wherein an individual balun of the one or more baluns is to communicate the radio frequency signal with the individual directional antenna, wherein the individual balun is to provide impedance matching for the radio frequency signal communicated between the individual directional antenna and the radio frequency module or between the individual directional antenna and the anomalous phase detector.

Example 4 is a method according to any examples herein, in particular example 1, wherein an individual directional antenna of the one or more directional antennas is a directional antenna comprising: a feedline to communicate a radio frequency signal with the directional antenna; a dipole, wherein the dipole is a driven element coupled to the feedline; and a plurality of director elements substantially below the dipole, wherein a first director element of the plurality of director elements is electrically isolated from the dipole, wherein an individual director element of the plurality of director elements is electrically isolated from every other director element of the plurality of director elements, and wherein a shape of the individual director element is one of: rectangular; polygonal; curved; or any combination thereof.

Example 5 is a method according to any examples herein, in particular example 1, wherein an individual directional antenna of the one or more directional antennas is one of: Yagi-Uda antenna, parabolic reflector antenna, horn antenna, patch antenna, or log-periodic antenna.

Example 6 is a method according to any examples herein, in particular example 1, wherein a depth of the one or more concealed metal objects is approximated by a distance at which an individual directional antenna of the one or more directional antennas exhibits anomalous phase distortion.

Example 7 is a method according to any examples herein, in particular example 1, wherein the radio frequency module or the anomalous phase detector is one of: vector network analyzer, phase noise tester, phase comparator, spectrum analyzer, oscilloscope, or any other phase measuring equipment.

Example 8 is an apparatus of a metal detecting ground penetrating radar, the apparatus comprising: one or more multilayer substrates, wherein an individual multilayer substrate of the one or more multilayer substrates includes: one or more conductive layers; and one or more directional antennas etched on the one or more conductive layers; a radio frequency module coupled to the one or more directional antennas, wherein the radio frequency module is to generate a radio frequency signal, and wherein the radio frequency module is to supply the radio frequency signal to the one or more directional antennas; and an anomalous phase detector coupled to the one or more directional antennas, wherein the anomalous phase detector is to measure an anomalous phase distortion in the radio frequency signal received from the one or more directional antennas.

Example 9 is an apparatus according to any examples herein, in particular example 8, wherein the one or more multilayer substrates are coupled with a motorized system, and wherein the motorized system is to displace the one or more multilayer substrates vertically or horizontally over an area comprising one or more concealed metal objects.

Example 10 is an apparatus according to any examples herein, in particular example 8, wherein the individual multilayer substrate includes: one or more baluns etched on the one or more conductive layers, wherein an individual balun of the one or more baluns is to communicate the radio frequency signal with an individual directional antenna of the one or more directional antennas, and wherein the individual balun is to provide impedance matching for the radio frequency signal communicated between the radio frequency module or the anomalous phase detector and the individual directional antenna.

Example 11 is an apparatus according to any examples herein, in particular example 8, wherein an individual directional antenna of the one or more directional antennas is a Yagi-Uda antenna comprising: a feedline to communicate a radio frequency signal with the directional antenna; a dipole, wherein the dipole is a driven element coupled to the feedline; and a plurality of director elements etched on the one or more conductive layers substantially below the dipole, wherein a first director element of the plurality of director elements is electrically isolated from the dipole, wherein an individual director element of the plurality of director elements is electrically isolated from every other director element of the plurality of director elements, and wherein a shape of the individual director element is one of: rectangular; polygonal; curved; or any combination thereof.

Example 12 is an apparatus according to any examples herein, in particular example 8, wherein an individual directional antenna of the one or more directional antennas is one of: Yagi-Uda antenna, parabolic reflector antenna, horn antenna, patch antenna, or log-periodic antenna.

Example 13 is an apparatus according to any examples herein, in particular example 8, wherein the anomalous phase detector measures the anomalous phase distortion by detecting a double slope shift or by spectrally integrating a positive phase slope of a phase response of one or more directional antennas.

Example 14 is an apparatus according to any examples herein, in particular example 8, wherein the radio frequency module or the anomalous phase detector is one of: vector network analyzer, phase noise tester, phase comparator, spectrum analyzer, oscilloscope, or any other phase analysis equipment.

Example 15 is a system of a metal detecting ground penetrating radar, the system comprising: one or more directional antennas to transmit and receive radio frequency signals; a radio frequency module coupled to the one or more directional antennas, wherein the radio frequency module is to generate a radio frequency signal, and wherein the radio frequency module is to supply the radio frequency signal to the one or more directional antennas; and an anomalous phase detector coupled to the one or more directional antennas, wherein the anomalous phase detector is to measure a phase distortion in the radio frequency signal received from the one or more directional antennas.

Example 16 is a system according to any examples herein, in particular example 15, wherein the one or more directional antennas are coupled with a motorized system, and wherein the motorized system is to displace the one or more directional antennas vertically or horizontally over an area comprising one or more concealed metal objects.

Example 17 is a system according to any examples herein, in particular example 15, wherein an individual directional antenna of the one or more directional antennas includes: one or more baluns, wherein an individual balun of the one or more baluns is to communicate the radio frequency signal with the individual directional antenna, wherein the individual balun is to provide impedance matching for the radio frequency signal communicated between the individual directional antenna and the radio frequency module or between the individual directional antenna and the anomalous phase detector.

Example 18 is a system according to any examples herein, in particular example 15, wherein an individual directional antenna of the one or more directional antennas is a Yagi-Uda antenna comprising: a feedline to communicate a radio frequency signal with the directional antenna; a dipole, wherein the dipole is a driven element coupled to the feedline; and a plurality of director elements substantially below the dipole, wherein a first director element of the plurality of director elements is electrically isolated from the dipole, wherein an individual director element of the plurality of director elements is electrically isolated from every other director element of the plurality of director elements, and wherein a shape of the individual director element is one of: rectangular; polygonal; curved; or any combination thereof.

Example 19 is a system according to any examples herein, in particular example 15, wherein an individual directional antenna of the one or more directional antennas is one of: Yagi-Uda antenna, parabolic reflector antenna, horn antenna, patch antenna, or log-periodic antenna.

Example 20 is a system according to any examples herein, in particular example 15, wherein the one or more directional antennas include: a plurality of director elements substantially below an individual directional antenna of the one or more directional antennas, wherein a first director element of the plurality of director elements is electrically isolated from the individual directional antenna, wherein an individual director element of the plurality of director elements is electrically isolated from every other director element of the plurality of director elements, and wherein a shape of the individual director element is one of: rectangular; polygonal; curved; or any combination thereof.

Example 21 is a method of metal detection using ground penetrating radar, the method comprising: generating a radio frequency signal in a radio frequency module; supplying the radio frequency signal to one or more directional antennas; scanning the one or more directional antennas over an area, wherein the area comprises one or more concealed metal objects; receiving a radio frequency signal from the one or more directional antennas; measuring a dual slope shift in the phase of the radio frequency signal received from the one or more directional antennas using a slope evaluator; and detecting a concealed metal object with the anomalous phase distortion measured in the radio frequency signal received from the one or more directional antennas.

Example 22 is a method according to any examples herein, in particular example 21, wherein the one or more directional antennas are scanned using a motorized system, wherein the motorized system displaces the one or more directional antennas vertically or horizontally over an area comprising one or more concealed metal objects.

Example 23 is a method according to any examples herein, in particular example 21, wherein an individual directional antenna of the one or more directional antennas includes: one or more baluns, wherein an individual balun of the one or more baluns is to communicate the radio frequency signal with the individual directional antenna, wherein the individual balun is to provide impedance matching for the radio frequency signal communicated between the individual directional antenna and the radio frequency module or between the individual directional antenna and the anomalous phase detector.

Example 24 is a method according to any examples herein, in particular example 21, wherein an individual directional antenna of the one or more directional antennas is a Yagi-Uda antenna comprising: a feedline to communicate a radio frequency signal with the directional antenna; a dipole, wherein the dipole is a driven element coupled to the feedline; and a plurality of director elements substantially below the dipole, wherein a first director element of the plurality of director elements is electrically isolated from the dipole, wherein an individual director element of the plurality of director elements is electrically isolated from every other director element of the plurality of director elements, and wherein a shape of the individual director element is one of: rectangular; polygonal; curved; or any combination thereof.

Example 25 is a method according to any examples herein, in particular example 21, wherein an individual directional antenna of the one or more directional antennas is one of: Yagi-Uda antenna, parabolic reflector antenna, horn antenna, patch antenna, or log-periodic antenna.

Example 26 is a method according to any examples herein, in particular example 21, wherein a depth of the one or more concealed metal objects is approximated by a distance at which an individual directional antenna of the one or more directional antennas exhibits the maximum positive phase slope.

Example 27 is a method according to any examples herein, in particular example 21, wherein the slope evaluator measures the slope of the phase response recorded by a phase recorder.

Example 28 is a system of a metal detecting ground penetrating radar, the system comprising: one or more directional antennas to transmit and receive radio frequency signals; a radio frequency module coupled to the one or more directional antennas, wherein the radio frequency module is to generate a radio frequency signal, and wherein the radio frequency module is to supply the radio frequency signal to the one or more directional antennas; and an anomalous phase detector coupled to the one or more directional antennas, wherein the anomalous phase detector is to record the phase of the radio frequency signal received from the one or more directional antennas and evaluate two zero crossings or dual slope shift for detection of anomalous phase.

Example 29 is a system according to any examples herein, in particular example 28, wherein the one or more directional antennas are coupled with a motorized system, and wherein the motorized system is to displace the one or more directional antennas vertically or horizontally over an area comprising one or more concealed metal objects until anomalous phase is detected.

Example 30 is a system according to any examples herein, in particular example 28, wherein an individual directional antenna of the one or more directional antennas includes: one or more baluns, wherein an individual balun of the one or more baluns is to communicate the radio frequency signal with the individual directional antenna, wherein the individual balun is to provide impedance matching for the radio frequency signal communicated between the individual directional antenna and the radio frequency module or between the individual directional antenna and the anomalous phase detector.

Example 31 is a system according to any examples herein, in particular example 28, wherein an individual directional antenna of the one or more directional antennas is a Yagi-Uda antenna comprising: a feedline to communicate a radio frequency signal with the directional antenna; a dipole, wherein the dipole is a driven element coupled to the feedline; and a plurality of director elements substantially below the dipole, wherein a first director element of the plurality of director elements is electrically isolated from the dipole, wherein an individual director element of the plurality of director elements is electrically isolated from every other director element of the plurality of director elements, and wherein a shape of the individual director element is one of: rectangular; polygonal; curved; or any combination thereof.

Example 32 is a system according to any examples herein, in particular example 28, wherein an individual directional antenna of the one or more directional antennas is one of: Yagi-Uda antenna, parabolic reflector antenna, horn antenna, patch antenna, or log-periodic antenna.

Example 33 is a system according to any examples herein, in particular example 28, wherein the one or more directional antennas include: a plurality of director elements substantially below an individual directional antenna of the one or more directional antennas, wherein a first director element of the plurality of director elements is electrically isolated from the individual directional antenna, wherein an individual director element of the plurality of director elements is electrically isolated from every other director element of the plurality of director elements, and wherein a shape of the individual director element is one of: rectangular; polygonal; curved; or any combination thereof.

An abstract is provided that will allow the reader to ascertain the nature and the gist of technical disclosure. An abstract is submitted with an understanding that it will not be used to limit scope or meaning of claims. The following claims are hereby incorporated into the detailed description, with each claim standing on its own as a separate example.

What is claimed is:

1. A method of metal detection using a ground penetrating radar, the method comprising:

- generating a radio frequency signal by a radio frequency module;
- supplying the radio frequency signal to one or more directional antennas of the ground penetrating radar;
- scanning the one or more directional antennas over an area of a surface after transmitting the radio frequency signal from the one or more directional antennas, wherein the transmitted radio signal enters a subsurface of the area of a surface, wherein the subsurface contains one or more concealed metal objects, and wherein the one or more concealed metal objects reflects the transmitted radio frequency signal;

receiving a reflected radio frequency signal from the one or more directional antennas of the ground penetrating radar;

measuring an anomalous phase distortion in the reflected radio frequency signal received from the one or more directional antennas using an anomalous phase detector by detecting a double slope shift or by spectrally integrating a positive phase slope of a phase response of the one or more directional antennas; and detecting a concealed metal object if the anomalous phase distortion is observed in the reflected radio frequency signal received from the one or more directional antennas of the ground penetrating radar.

2. The method of claim 1, wherein the one or more directional antennas are scanned using a motorized system, wherein the motorized system displaces the one or more directional antennas vertically or horizontally over the area of the surface containing the one or more concealed metal objects.

3. The method of claim 1, wherein an individual directional antenna of the one or more directional antennas includes:

one or more baluns, wherein an individual balun of the one or more baluns is to communicate the radio frequency signal with the individual directional antenna, wherein the individual balun is to provide impedance matching for the radio frequency signal communicated between the individual directional antenna and the radio frequency module or between the individual directional antenna and the anomalous phase detector.

4. The method of claim 1, wherein an individual directional antenna of the one or more directional antennas is a Yagi-Uda antenna comprising:

a feedline to communicate the radio frequency signal with the individual directional antenna;

a dipole, wherein the dipole is a driven element coupled to the feedline; and a plurality of director elements substantially below the dipole, wherein a first director element of the plurality of director elements is electrically isolated from the dipole, wherein an individual director element of the plurality of director elements is electrically isolated from every other director element of the plurality of director elements, and wherein a shape of the individual director element is one of:

rectangular;

polygonal;

curved; or any combination thereof.

5. The method of claim 1, wherein an individual directional antenna of the one or more directional antennas is one of: Yagi-Uda antenna, parabolic reflector antenna, horn antenna, patch antenna, or log-periodic antenna.

6. The method of claim 1, wherein a depth of the one or more concealed metal objects is approximated by a distance at which an individual directional antenna of the one or more directional antennas exhibits the anomalous phase distortion.

7. The method of claim 1, wherein the radio frequency module or the anomalous phase detector is one of: vector network analyzer, phase noise tester, phase comparator, spectrum analyzer, or oscilloscope.

8. An apparatus of a metal detecting ground penetrating radar, the apparatus comprising:

one or more multilayer substrates, wherein an individual multilayer substrate of the one or more multilayer substrates includes:

one or more conductive layers; and one or more directional antennas etched on the one or more conductive layers;

a radio frequency module coupled to the one or more directional antennas, wherein the radio frequency module is to generate a radio frequency signal, and wherein the radio frequency module is to supply the radio frequency signal to the one or more directional antennas; and an anomalous phase detector coupled to the one or more directional antennas, wherein the anomalous phase detector is to measure an anomalous phase distortion in the radio frequency signal received from the one or more directional antennas by detecting a double slope shift or by spectrally integrating a positive phase slope of a phase response of the one or more directional antennas.

9. The apparatus of claim 8, wherein the one or more multilayer substrates are coupled with a motorized system, and wherein the motorized system is to displace the one or more multilayer substrates vertically or horizontally over an area comprising one or more concealed metal objects.

10. The apparatus of claim 8, wherein the individual multilayer substrate includes:

one or more baluns etched on the one or more conductive layers, wherein an individual balun of the one or more baluns is to communicate the radio frequency signal with an individual directional antenna of the one or more directional antennas, and wherein the individual balun is to provide impedance matching for the radio frequency signal communicated between the radio frequency module or the anomalous phase detector and the individual directional antenna.

11. The apparatus of claim 8, wherein an individual directional antenna of the one or more directional antennas is a Yagi-Uda antenna comprising:

a feedline to communicate the radio frequency signal with the individual directional antenna;

a dipole, wherein the dipole is a driven element coupled to the feedline; and a plurality of director elements etched on the one or more conductive layers substantially below the dipole, wherein a first director element of the plurality of director elements is electrically isolated from the dipole, wherein an individual director element of the plurality of director elements is electrically isolated from every other director element of the plurality of director elements, and wherein a shape of the individual director element is one of:

rectangular;

polygonal;

curved; or any combination thereof.

12. The apparatus of claim 8, wherein an individual directional antenna of the one or more directional antennas is one of: a Yagi-Uda antenna, a parabolic reflector antenna, a horn antenna, a patch antenna, or a log-periodic antenna.

13. The apparatus of claim 8, wherein the anomalous phase detector measures the anomalous phase distortion by detecting a double slope shift or by spectrally integrating a positive phase slope of a phase response of the one or more directional antennas.

14. The apparatus of claim 8, wherein the radio frequency module or the anomalous phase detector is one of: a vector network analyzer, a phase noise tester, a phase comparator, a spectrum analyzer, or an oscilloscope.

15. A system of a metal detecting ground penetrating radar, the system comprising:

one or more directional antennas to transmit and receive radio frequency signals;

a radio frequency module coupled to the one or more directional antennas, wherein the radio frequency module is to generate a radio frequency signal, and wherein the radio frequency module is to supply the radio frequency signal to the one or more directional antennas; and an anomalous phase detector coupled to the one or more directional antennas, wherein the anomalous phase detector is to measure a phase distortion in the radio frequency signal received from the one or more directional antennas by detecting a double slope shift or by spectrally integrating a positive phase slope of a phase response of the one or more directional antennas.

16. The system of claim 15, wherein the one or more directional antennas are coupled with a motorized system, and wherein the motorized system is to displace the one or more directional antennas vertically or horizontally over an area comprising one or more concealed metal objects.

17. The system of claim 15, wherein an individual directional antenna of the one or more directional antennas includes:

one or more baluns, wherein an individual balun of the one or more baluns is to communicate the radio frequency signal with the individual directional antenna, wherein the individual balun is to provide impedance matching for the radio frequency signal communicated between the individual directional antenna and the radio frequency module or between the individual directional antenna and the anomalous phase detector.

18. The system of claim 15, wherein an individual directional antenna of the one or more directional antennas is a Yagi-Uda antenna comprising:

a feedline to communicate the radio frequency signal with the individual directional antenna;

a dipole, wherein the dipole is a driven element coupled to the feedline; and a plurality of director elements substantially below the dipole, wherein a first director element of the plurality of director elements is electrically isolated from the dipole, wherein an individual director element of the plurality of director elements is electrically isolated from every other director element of the plurality of director elements, and wherein a shape of the individual director element is one of:

rectangular;

polygonal;

curved; or any combination thereof.

19. The system of claim 15, wherein an individual directional antenna of the one or more directional antennas is one of: a Yagi-Uda antenna, a parabolic reflector antenna, a horn antenna, a patch antenna, or a log-periodic antenna.

20. The system of claim 15, wherein the one or more directional antennas include:

a plurality of director elements substantially below an individual directional antenna of the one or more directional antennas, wherein a first director element of the plurality of director elements is electrically isolated from the individual directional antenna, wherein an individual director element of the plurality of director elements is electrically isolated from every other director element of the plurality of director elements, and wherein a shape of the individual director element is one of:

rectangular;

polygonal;

curved; or any combination thereof.

* * * * *